(12) United States Patent
Nakajima et al.

(10) Patent No.: US 7,056,559 B2
(45) Date of Patent: Jun. 6, 2006

(54) INK-JET IMAGE FORMING METHOD

(75) Inventors: Atsushi Nakajima, Hachioji (JP); Nobumasa Sasa, Sayama (JP); Yoko Hirai, Hachioji (JP); Ai Kondo, Hino (JP)

(73) Assignee: Konica Corporation, Tokyo (JP)

( * ) Notice: Subject to any disclaimer, the term of this patent is extended or adjusted under 35 U.S.C. 154(b) by 221 days.

(21) Appl. No.: 10/647,169

(22) Filed: Aug. 21, 2003

(65) Prior Publication Data

US 2004/0050292 A1 Mar. 18, 2004

(30) Foreign Application Priority Data

| Aug. 30, 2002 | (JP) | ............................. 2002-252356 |
| Aug. 30, 2002 | (JP) | ............................. 2002-252357 |
| Aug. 30, 2002 | (JP) | ............................. 2002-252358 |
| Aug. 30, 2002 | (JP) | ............................. 2002-252360 |
| Aug. 30, 2002 | (JP) | ............................. 2002-252363 |

(51) Int. Cl.
*B05D 1/32* (2006.01)
*B41J 2/01* (2006.01)
*C08J 3/28* (2006.01)
*C09D 11/02* (2006.01)

(52) U.S. Cl. .................. 427/466; 347/102; 522/31; 106/31.58; 106/31.86

(58) Field of Classification Search ............ 106/31.58, 106/31.86; 347/102; 430/270.1, 280.1; 522/6, 31, 168; 427/466
See application file for complete search history.

(56) References Cited

U.S. PATENT DOCUMENTS

| 5,463,084 | A | * | 10/1995 | Crivello et al. ............. 549/214 |
| 5,674,922 | A | * | 10/1997 | Igarashi et al. .............. 522/168 |
| 6,084,004 | A | | 7/2000 | Weinmann et al. |
| 6,846,074 | B1 | * | 1/2005 | Hirai ........................... 347/102 |
| 2003/0158286 | A1 | * | 8/2003 | Nishizaki et al. ........... 522/168 |
| 2003/0231234 | A1 | * | 12/2003 | Ushirogouchi et al. ..... 347/100 |
| 2003/0234848 | A1 | * | 12/2003 | Ishikawa ..................... 347/102 |
| 2004/0052967 | A1 | * | 3/2004 | Takabayashi ................ 427/511 |
| 2004/0052968 | A1 | * | 3/2004 | Takabayashi ................ 427/511 |
| 2004/0069182 | A1 | * | 4/2004 | Nakajima ................. 106/31.13 |
| 2004/0075726 | A1 | * | 4/2004 | Hirai ........................... 347/102 |
| 2004/0141040 | A1 | * | 7/2004 | Nakajima .................... 347/102 |
| 2004/0196322 | A1 | * | 10/2004 | Nakajima et al. ............. 347/14 |
| 2004/0201659 | A1 | * | 10/2004 | Watanabe .................... 347/100 |
| 2004/0227798 | A1 | * | 11/2004 | Nakajima .................... 347/100 |
| 2004/0241578 | A1 | * | 12/2004 | Hirai ....................... 430/270.1 |
| 2004/0244641 | A1 | * | 12/2004 | Takabayashi ............. 106/31.27 |
| 2004/0252171 | A1 | * | 12/2004 | Nishizeki et al. ........... 347/100 |

FOREIGN PATENT DOCUMENTS

| JP | 5-54667 | 3/1993 |
| JP | 6-20204 A | 1/1994 |
| JP | 8-143806 A | 6/1996 |

(Continued)

OTHER PUBLICATIONS

U.S. Appl. No. 10/677,170, filed Aug. 21, 2003, Takabayashi.

(Continued)

*Primary Examiner*—Helene Klemanski
(74) *Attorney, Agent, or Firm*—Frishauf, Holtz, Goodman & Chick, P.C.

(57) ABSTRACT

A photocurable ink for ink-jet recording, comprising an oxetane compound having a substituent at the 2-position of the molecule.

22 Claims, 1 Drawing Sheet

FOREIGN PATENT DOCUMENTS

| | | |
|---|---|---|
| JP | 2679586 | 8/1997 |
| JP | 2000-504778 A | 4/2000 |
| JP | 2000-256571 A | 9/2000 |
| JP | 2001-181386 A | 7/2001 |
| JP | 2001-220526 | 8/2001 |
| JP | 2001-220526 A | 8/2001 |
| JP | 2002-137375 | 5/2002 |
| JP | WO 02/36660 A1 | 5/2002 |
| JP | 2002-188025 A | 7/2002 |

OTHER PUBLICATIONS

U.S. Appl. No. 10/648,579, filed Aug. 25, 2003, Takabayashi.

* cited by examiner

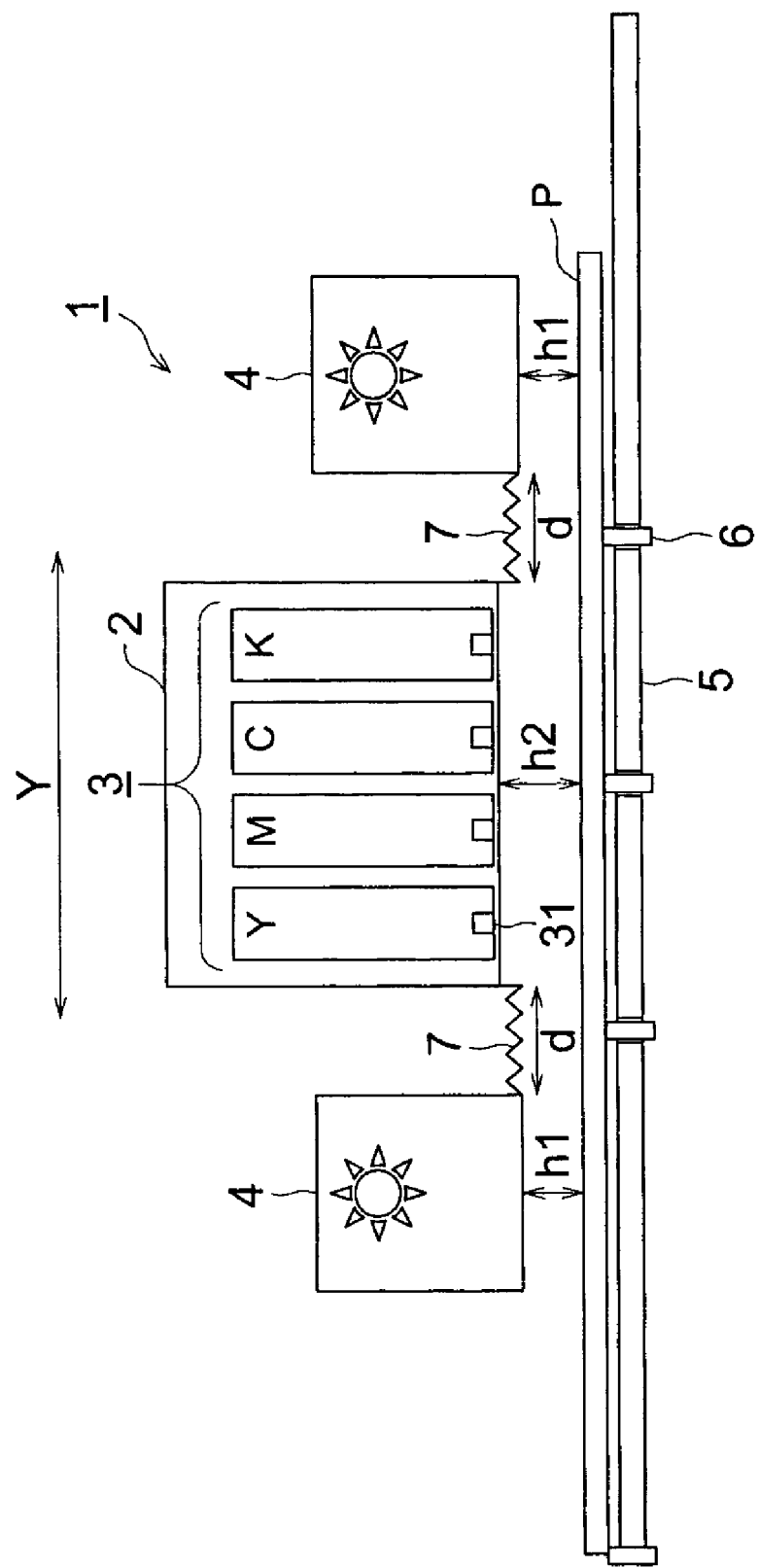

INK-JET IMAGE FORMING METHOD

TECHNICAL FIELD

The present invention relates to an ink-jet ink comprising an oxetane compound and an ink-jet image forming method using thereof. More specifically the present invention relates to a photo-curable ink-jet ink comprising an oxetane compound which is cationic polymerizable, and an ink-jet image forming method using the ink having high reactivity and producing high quality image.

BACKGROUND

In recent years, an ink-jet recording method has found wide applications in the field of various kinds of graphic arts such as photography, various printing, marking and specific printing such as a color filter because of being able to form images simply and cheap. Particularly, it has come to be possible also to obtain image quality compatible with silver salt photography by utilizing a recording apparatus which ejects and controls fine dots; ink in which such as a color reproduction range, durability and ejection suitability have been improved; and exclusive paper in which such as ink absorption, color forming property of a colorant and surface gloss have been improved greatly. Image quality improvement of an ink-jet recording method of today has been achieved only when a complete set of a recording apparatus, ink and exclusive paper is prepared.

However, an ink-jet system which requires exclusive paper is problematic in respect to limitation of a recording medium and cost up of a recording medium. Therefore, many attempts to record on a medium, on which ink is transferred, different from exclusive paper by means of an ink-jet recording. Concretely, there are such as a phase-conversion ink-jet method utilizing wax which is solid at room temperature, a solvent-type ink-jet method utilizing an ink which is mainly comprised of a rapid-drying organic solvent and a UV ink-jet method in which an ink is cross-linked by ultraviolet (UV) light after recording.

Among them, a UV ink-jet method has been noted recently in respect to relatively low odor compared to a solvent-type ink-jet method, rapid drying property and capability of recording on a recording medium without ink absorption property; UV-curable ink-jet ink is disclosed, for example, in Japanese Patent Publication No. 5-54667, JP-A (hereinafter, JP-A refers to Japanese Patent Publication Open to Public Inspection) No. 6-20204 and Japanese Translated PCT Patent Publication No. 2000-504778.

It is known that the aforesaid UV ink can be divided mainly into a radical polymerization type and a cationic polymerization type. In an ultraviolet radiation curable ink-jet recording system, image quality, i.e. impinged dot diameter, is controlled by factors such as light exposure timing after ink impingement, illuminance of exposed light, energy, ink droplet size, photosensitivity of ink, surface energy, viscosity, wettability of substrates, impingement pattern, and error diffusion pattern. Specifically, factors which mainly affect image quality are photosensitivity, viscosity, and surface tension of ink, wettability of substrates, and exposure conditions. Of these, when ink is cured by radical polymerization, photosensitivity is adversely affected by polymerization inhibition due to exposure to oxygen. As a result, the aforesaid photosensitivity largely depends on ink layer thickness and illuminance of exposing light. On the other hand, when ink is cured by cationic polymerization, photosensitivity is largely dependent on humidity, as well as temperature.

When a radically polymerizable ultraviolet radiation curable ink is used, in order to minimize the polymerization inhibition due to exposure to oxygen, known are inventions in regard to monomers, initiators, and initiation aids which are free from oxygen inhibition, and methods in which purging is performed employing inert gases such as nitrogen.

When a cationically polymerizable ultraviolet radiation curable ink is employed, in order to minimize the humidity dependent effects, known is a method in which impinged ink is heated as disclosed in Japanese Patent Application Open to Public Inspection No. 2002-137375.

Known as cationically polymerizable monomers employed in the cationically polymerizable ultraviolet radiation curable ink are epoxy compounds having oxirane ring(s), oxetane compounds, and vinyl ether compounds.

In particular, it is known that by using epoxy compounds together with oxetane compounds, the polymerization rate increases markedly. For example, pertinent publications include Toa Gosei Kenkyu Nenpo (Toa Gosei Annual Research Report) TREND No. 2 (1999), "Oxetane Kagobutsu no Hikari Cation Koka System eno Oyo (Application of Oxetane Compounds to Cationically Photocurable System of Oxetane Compounds" and Japanese Patent Publication No. 2679586". Specifically, since oxetane compounds result in excellent heat resistance, adhesive properties, and chemical resistance, it is useful to simultaneously use these epoxy compounds which enhance reactivity.

As an application example of the aforesaid technique, Japanese Patent Application Open to Public Inspection No. 2001-220526 discloses an application to ultraviolet radiation curable ink-jet printing. In recent years, the ultraviolet radiation curable ink-jet recording system, in which ink is cured by ultraviolet radiation, has received attention as an image forming method employing substrates with less ink absorbability.

Generally, well known and used in practice as ultraviolet radiation curable ink is radically polymerizable ink. On the other hand, cationically polymerizable ink exhibits advantages such that polymerization inhibition due to oxygen, as found in the radically polymerizable ink, does not occur, low illuminance light sources are usable, unpleasant odors usually generated by acryl monomers are not formed, and components are low irritant, however, has not been put into practical use.

Listed as reasons for not being in practical use are properties in which photosensitivity markedly decreases under high humidity and is temperature dependent. Ambience dependent ink exhibits substantial problems in which its image quality varies depending on various ambience.

Japanese Patent Application Open to Public Inspection No. 2002-137375 discloses a method in which cationically polymerizable ink is employed, and impinged ink is heated and subsequently exposed to radiation. However, from the viewpoint of printer cost and use of low heat resistant components, the use of heating mechanism seems to not be preferable. Further, Japanese Patent Application Open to Public Inspection No. 2001-181386 discloses 2-(4-metoxyphenyl)-3,3-dimethyloxetane as a compound to increase the reaction rate while employing oxetane compounds. Said compounds, when employed together with oxetane compounds such as di[1-ethyl(3-oxetanyl)]methyl ether and alicyclic epoxy compounds, exhibits reactivity which makes it possible to replace the alicyclic epoxy compounds. However, when low illuminance light sources such as a fluorescent lamp are employed, the resulting photosensitivity under high humidity ambience has not been sufficient.

SUMMARY

From the viewpoint of the aforesaid problems, the present invention was achieved. An object of the present invention is to provide an oxetane compound capable of forming high quality images without bleeding, which exhibits excellent ink curability and close adhesion property to substrates, being not adversely affected by ambient humidity while even employing a low illuminance light source, an ink-jet ink capable of forming high quality images, and an image forming method using the aforesaid ink-jet ink.

An object of the present invention can be achieved by the following embodiments.

1. A photocurable ink for ink-jet recording, comprising an oxetane compound having a substituent at the 2-position of the molecule.
2. The photocurable ink for ink-jet recording of item 1, wherein the oxetane compound has an electron-donating group and an electron-withdrawing group in the molecule.
3. The photocurable ink for ink-jet recording of item 1, wherein the oxetane compound is represented by General Formula (1):

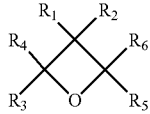

General Formula (1)

wherein each $R_1$ to $R_6$ is independently a hydrogen atom or a substituent, provided that at least one of $R_3$ and $R_4$ is a substituent, and at least one of $R_5$ and $R_6$ is a substituent.
4. The photocurable ink for ink-jet recording of item 3, wherein the oxetane compound has an electron-donating group at the 2-position of the molecule, and an electron-withdrawing group at the 4-position of the molecule.
5. The photocurable ink for ink-jet recording of item 2, wherein the oxetane compound has a substituent at the 3-position of the molecule.
6. The photocurable ink for ink-jet recording of item 1, wherein the oxetane compound has at least two oxetane rings in the molecule, and at least one of the rings is represented by General Formula (1):

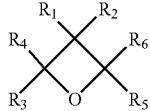

General Formula (1)

wherein each $R_1$ to $R_6$ is independently a hydrogen atom or a substituent, provided that at least one of $R_3$ and $R_4$ is a substituent, and at least one of $R_5$ and $R_6$ is a substituent.
7. The photocurable ink for ink-jet recording of item 6, wherein at least one of oxygen atoms of the oxetane rings has a largest electron density in the oxetane compound.
8. The photocurable ink for ink-jet recording of item 1, wherein the oxetane compound further comprises an oxygen atom other than an oxygen atom of an oxetane ring, and an electron density of the oxygen atom other than the oxygen atom of the oxetane ring is less than an electron density of the oxygen atom of the oxetane ring.
9. The photocurable ink for ink-jet recording of item 1, wherein the ink further comprises a photo-acid generating compound.
10. The photocurable ink for ink-jet recording of item 1, wherein the ink further comprises a compound selected from the group consisting of:
   (i) mono-oxetane ring containing compounds;
   (ii) epoxy compounds; and
   (iii) vinyl ether compounds.
11. A method for forming an image, comprising the steps of:
   jetting a droplet of the ink of item 1 from an ink-jet head onto a recording material; and
   irradiating the jetted droplet of the ink with a an active ray, wherein an amount of an energy input to an exposure light source for supplying the active ray is 0.1 to 50 W/cm.
12. A method for forming an image, comprising the steps of:
   jetting a droplet of the ink of item 1 from an ink-jet head onto a recording material; and
   irradiating the jetted droplet of the ink with an active ray, wherein the irradiating step is carried out between 0.001 and 2.0 seconds after the jetted droplet of the ink reaches on the recording material.
13. A method for forming an image of item 11, wherein an illuminance on a surface of the recording material during the irradiating step is from 0.1 to 50 mW/cm² in a range of 200 to 450 nm.
14. A method for forming an image of item 11, wherein the active ray is an ultraviolet ray having a peak wavelength of 200 to 420 nm.

In order to overcome the aforesaid problems, the inventors of the present invention performed diligent investigations. As a result, it was discovered that by using, in an ink-jet ink, oxetane compounds which were characterized in that an electron donating group as well as an electron attractive group was incorporated into the molecular structure and the 2-position was substituted, it was possible to prepare high quality images being not affected by ambient humidity even while employing low illuminance light sources. As a result, the present invention was realized.

Further, in the present invention, when employed as oxetane compounds are multifunctional oxetane compounds, having at least two oxetane rings, in which the 2-positin is substituted with an electron donating group, the 4-position is substituted with an electron attractive group and the 3-position has a substituent, it is possible to further enhance the effects of the present invention.

In the present invention, by substituting the 2-position of oxetane compounds with an electron donating group, the O—C distance of the oxetane ring increases to result in higher reactivity. Further, by substituting the 4-position with an electron attractive group, the oxetane structure is deformed to be unsymmetrical on the 2-position side and the 4-position side, whereby it becomes possible to have a structure resulting in higher reactivity.

Further, by allowing the 3-position of oxetane compounds to have a substituent, when employed as an ink composition, it is possible to enhance compatibility with other compounds whereby by forming a multifunctional structure, it becomes possible to appropriately incorporate safety, hydrophobicity, viscosity, surface tension, and other physical parameters.

By allowing for multifunctionality, it becomes possible to enhance the reaction rate as well as physical properties of cured layers.

The multifunctional oxetane compounds in the present invention comprise at least two oxetane rings in which at least one of the oxetane rings is a residue of the oxetane compound substituted at the 2-position, represented by aforesaid General Formula (1). Preferred are compounds which comprises at least one of the residues of the oxetane compounds represented by aforesaid General Formula (1) in which the 2-position is substituted, and further comprises an oxetane ring in which the 2-positin is not substituted. The residue of the oxetane compound, as described herein, refers to a univalent or higher valent group which is formed by extracting at least one hydrogen atom in the oxetane compound.

The aforesaid oxetane compounds according to the present invention are comprised of at least two oxetane ring structures and include an oxetane compound in which the oxygen atom which constitutes at least one oxetane ring exhibits the highest electron density of all atoms which constitute the aforesaid oxetane ring, or an oxetane compound, having an oxygen atom other than atoms constituting an oxetane ring, in which the electron density of the atom other than atoms which constitute the aforesaid oxetane ring is lower than that of the oxygen atom which constitutes the aforesaid oxetane ring. The present invention is achieved by employing any of the aforesaid oxetane compounds. Electron density, as described herein, refers to the value calculated based on a molecular orbital calculation method, employing WinMOPAC (manufactured by Fujitsu Ltd.).

Of those satisfying such conditions, preferably employed are an oxetane compound which has a substituent other than a hydrogen atom at the 2-position, and further an oxetane compound which has, in the molecule, at least one oxetane ring having the structure represented by General Formula (1), described below. The compound represented by General Formula (1) is only one example and is not limited thereto.

Further, in the ink-jet ink of the present invention, by using the oxetane compounds of the present invention together with oxetane compounds having no substituent at the 2-position, it becomes possible to achieve low viscosity preferred for an ink-jet ink and also possible to enhance the reactivity as well as the cured layer strength. Still further, by using the oxetane compounds together with epoxy compounds or vinyl ether compounds, which are cationically polymerizable monomers usable in combination, it becomes possible to appropriately control physical properties of the resulting layers, close adhesion properties to substrates, and physical properties of the ink.

BRIEF DESCRIPTION OF THE DRAWINGS

FIG. 1 is a front view showing the structure of the main section of the recording apparatus employed in the present invention.

DESCRIPTION OF THE PREFERRED EMBODIMENTS

The present invention will now be detailed.

The oxetane compounds of the present invention are characterized in that in the molecular structure, incorporated is an electron donating group as well as an electron attractive group, and the 2-position is substituted. Of these, preferred are multifunctional oxetane compounds, having at least two oxetane rings, in which the 2-position is substituted with an electron donating group, the 4-position is substituted with an electron attractive group, and the 3-position has a substituent.

In the oxetane compounds of the present invention, an electron donating group, as described herein, refers to the substituent which results in a negative Hammett substituent constant σp value. Examples of such compounds include —$NH_2$ or alkyl (R) substituted —$NR_2$, —OH, —$OCH_3$, or an alkoxy group comprised of an alkyl group having at least two carbon atoms, —$NHCOCH_3$ or an alkyl (R) substituted —$NRCOCR_3$, —$C_6H_5$, a substituted type —$C_6H_5$ described in Japanese Patent Application Open to Public Inspection No. 2001-181386, —$CH_3$, or an alkyl group having at least two carbon atoms, or a cyclic alkyl group such as a cyclohexyl group. Of these, preferred are structures having no basic N atom. The aforesaid basic N atom quenches protons which are active species of cationic polymerization, whereby photosensitivity decreases.

On the other hand, an electron attractive group, as described herein, refers to the substituent which results in a positive Hammett substituent constant σp value. Specific examples of electron attractive groups include —$N(CH_3)_3^+$, —$NO_2$, —CN, —$SO_3H$, —COOH, —CHO, —COR, —X (halogen), —$CX_3$ or a halogenated alkyl group having at least two carbon atoms. Of these, preferred are —COR, —X, and a halogenated alkyl group.

Based on molecular calculation, it is possible to estimate to some extent the reactivity of oxetane in which the aforesaid electron donating group and electron attractive group are substituted at the 2-position and the 4-position, respectively. For example, the molecular calculation achieved by employing Mopac 3.0, manufactured by Fujitsu Ltd., shows that in the case of providing a proton onto the O atom of oxetane, as O—C bond distance increases, reactivity also increases.

An oxetane compound of the present invention, represented by General Formula (1), has preferably at least one group derived from the oxetane ring in the molecule.

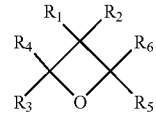

General Formula (1)

werein, $R_1$–$R_6$ each represents a hydrogen atom or a substituent, however, at least one of the groups represented by $R_3$–$R_6$ is a substituent.

In General Formula (1), $R_1$–$R_6$ each represents a hydrogen atom, a fluorine atom or an alkyl group having 1–6 carbon atoms (e.g., a methyl group, an ethyl group, a propyl group or a butyl group), an fluorinated alkyl group having 1–6 carbon atoms, an ally group, an aryl group (e.g., a phenyl group, a naphtyl group, a furyl group or a thienyl group. These may further have a substituent.

A compound having an oxetane ring in the molecule is represented by General Formulas (2)–(5) described below.

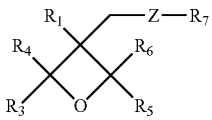

General Formula (2)

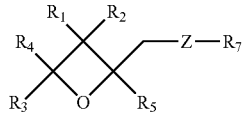

General Formula (3)

-continued

General Formula (4)

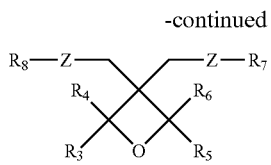

General Formula (5)

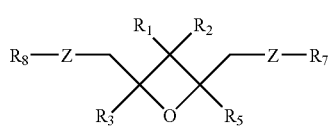

In General Formula (2) to (5), Z represents independently an oxygen atom or a sulfur atom, or a divalent hydrocarbon group which may have an oxygen atom or a sulfur atom in the main chain.

$R_1$–$R_6$ each represents a hydrogen atom, a fluorine atom or an alkyl group having 1–6 carbon atoms (e.g., a methyl group, an ethyl group, a propyl group or a butyl group), an fluorinated alkyl group having 1–6 carbon atoms, an ally group, an aryl group, a furyl group or a thienyl group.

$R_7$ and $R_8$ each represents an alkyl group having 1–6 carbon atoms (e.g., a methyl group, an ethyl group, a propyl group or a butyl group), an alkenyl group having 1–6 carbon atoms (e.g., a 1-propenyl group, a 2-propenyl group, a 2-methyl-1-propenyl group, a 2-methyl-2-propenyl group, a 1-butenyl group, a 2-butenyl group, or a 3-butenyl group), an aryl group (e.g., a phenyl group, a benzyl group, a fluorobenzyl group, a methoxybenzyl group or a phenoxybenzyl group), an alkylcarbonyl group having 1–6 carbon atoms (e.g., a propylcarbonyl group, a butylcarbonyl group, or a pentylcarbonyl group), an alkoxycarbonyl group having 1–6 carbon atoms (e.g., an ethoxycarbonyl group, a propoxycarbonyl group, or a butoxycarbonyl group), an alkylcarbamoyl group having 1–6 carbon atoms (e.g., a propylcarbamoyl group or a butylpentylcarbamoyl group, or an alkoxy carbamoyl group having 1–6 carbon atoms (e.g., an ethoxycarbamoyl group)

In General Formulas (2) and (4), at least one of $R_3$ or $R_4$, or one of $R_5$ or $R_6$ is not a hydrogen atom.

At least one of the groups represented by $R_1$ to $R_8$ or Z contains an oxygen atom, and the oxygen atom is required to have a lower electron density than a oxygen atom in a oxetane ring. The electron density is a value obtained using a molecular orbital calculation software "WinMopac".

When a sulfur atom is contained in one of the groups represented by $R_1$ to $R_8$ or Z, the sulfur atom is also required to have a lower electron density than a oxygen atom in a oxetane ring.

Preferable oxetane compounds having at least two oxetane groups in the molecule are represented by General Formulas (6) and (7) described below.

General Formula (6)

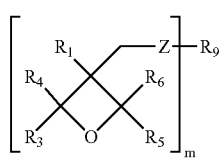

General Formula (7)

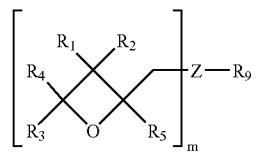

In General Formulas (6) and (7), m represents an integer of 2, 3, or 4; Z represents independently an oxygen atom or a sulfur atom, or a divalent hydrocarbon group which may have an oxygen atom or a sulfur atom in the main chain.

$R_1$–$R_6$ each represents a hydrogen atom, a fluorine atom or an alkyl group having 1–6 carbon atoms (e.g., a methyl group, an ethyl group, a propyl group or a butyl group), an fluorinated alkyl group having 1–6 carbon atoms, an ally group, an aryl group, a furyl group.

$R_9$ represents a straight or branched alkylene group having 1–12 carbon atoms. Examples are alkylene groups represented by General Formula (8) described below.

General Formula (8)

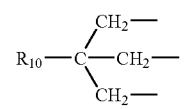

wherein $R_{10}$ represents a lower alkyl group (e.g., a methyl group, an ethyl group, or a propyl group).

In General Formula (6) and (7), $R_9$ represents a polyvalent group represented by General Formulas (9), (10) and (11).

General Formula (9)

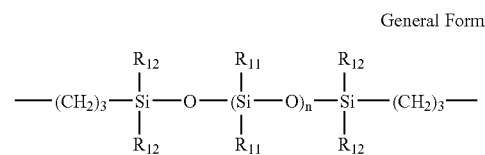

General Formula (10)

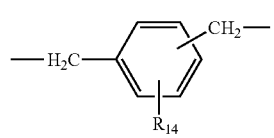

General Formula (11)

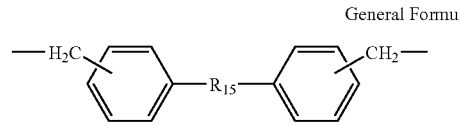

In General Formula (9) n represents 0 or an integer of 1–2,000, $R_{11}$ represents an alkyl group having 1–10 carbon atoms or the group represented by General Formula (12) described below.

$R_{12}$ represents an alkyl group having 1–10 carbon atoms (e.g., a methyl group, an ethyl group, a propyl group, a butyl group.

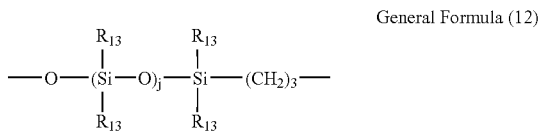

General Formula (12)

In General Formula (12), j represents 0 or an integer of 1–100, and $R_{13}$ represents an alkyl group having 1–10 carbon atoms (e.g., a methyl group, an ethyl group, a propyl group, a butyl group, a pentyl group, a hexyl group, a heptyl group, an octyl group, or a nonyl group).

In General Formula (10), $R_{14}$ represents a hydrogen atom, an alkyl group having 1–10 carbon atoms (e.g., a methyl group, an ethyl group, a propyl group, a butyl group), an alkoxy group having 1–10 carbon atoms (e.g. a methoxy group, an ethoxy group, a propoxy group, a butoxy group, and a pentoxy group), a halogen atom (e.g., a fluorine atom, a chlorine atom, a bromine atom, or an iodine atom), a nitro group, a cyano group, a mercapto group, an alkoxycarbonyl group of lower alkyl number (e.g., a methyloxycarbonyl group, an ethyloxycarbonyl group, or a butyloxycarbonyl group), or a carboxyl group.

In General Formula (11), $R_{15}$ represents an oxygen atom, a sulfur atom, —NH—, —SO—, —SO$_2$—, —CH$_2$—, —C(CH$_3$)$_2$—, or —C(CF$_3$)$_2$—.

In the present invention, of these compounds, useful compounds include an oxetane compound which is comprised of at least two oxetane rings in which the electron density of the oxygen atom constituting at least one oxetane ring is higher than that of atoms constituting the other molecule or an oxetane compound in which at least one of $R_1$–$R_8$ and Z is represented by an oxygen atom and the electron density of the oxygen atom constituting the oxetane ring is higher than that of atoms other than atoms constituting the oxetane ring. Namely, useful conditions of the present invention are that the electron density of atoms constituting the other portion of the molecule does not exceed that of the oxygen atom constituting the oxetane ring. Two oxetane rings are preferably joined via an alkylene group employing it as a joint portion.

Atoms constituting the other portion of the molecule include a carbon atom, an oxygen atom, a sulfur atom, and the like. Herein, it is necessary that based on the WinMopac calculation, the electron density of atoms other than atoms, such as an oxygen atom or a sulfur atom, constituting the oxetane ring does not exceed that of the oxygen atom in the oxetane ring.

Compounds usable in the present invention are listed below.

| | | Electron Density of Oxygen in Oxetane | Electron Density of Oxygen out of Oxetane |
|---|---|---|---|
| 1E | H$_3$C, CH$_3$, CF$_3$CO, O (structure) | −0.245 | −0.182 |
| 2E | H$_3$C, CH$_3$, H$_3$CO, O (structure) | −0.301 | −0.280 |
| 3E | (structure) | −0.281 | — |
| 4E | H$_3$CO, OCH$_3$ (structure) | −0.299 | −0.283 (methoxy) |
| 5E | H$_3$CO, OCH$_3$ (structure) | −0.301<br>−0.296 | −0.275<br>−0.284 (methoxy) |
| 6E | H$_3$C, H$_3$C, CH$_3$, CH$_3$ (structure) | −0.282<br>−0.281 | — |
| 7E | H$_3$C, H$_3$C, CH$_3$, CH$_3$ (structure) | −0.282 | −0.275 |

-continued

| | | Electron Density of Oxygen in Oxetane | Electron Density of Oxygen out of Oxetane |
|---|---|---|---|
| 8E | (structure) | −0.277 | — |
| 9E | (structure) | −0.320<br>−0.319 | −0.290 (methoxy)<br>−0.260 (methoxy) |
| 10E | (structure) | −0.278<br>−0.277 | — |
| Comparative | (structure) | −0.275 | −0.275 |

While referring to publications listed below, it is possible to synthesize compounds, according to the present invention, comprised of an oxetane ring in which at least the 2-position is substituted in which the electron density of atoms other than atoms constituting the aforesaid oxetane ring does not exceed that of the oxygen atom in the oxetane ring.

The following references can be applied to synthesize oxetane compounds of the present invention.

(1) Hu Xianming, Richard M. Kellogg, Synthesis, 533–538, May (1995)
(2) A. O. Fitton, J. Hill, D. Ejane, R. Miller, Synth., 12, 1140 (1987)
(3) Toshiro Imai and Shinya Nishida, Can. J. Chem. Vol. 59, 2503–2509 (1981)
(4) Nobujiro Shimizu, Shintaro Yamaoka, and Yuho Tsuno, Bull. Chem. Soc. Jpn., 56, 3853–3854 (1983)
(5) Walter Fisher and Cyril A. Grob, Helv. Chim. Acta., 61, 2336 (1987)
(6) Chem. Ber. 101, 1850 (1968)
(7) "Heterocyclic Compounds with Three- and Four-membered Rings", Part Two, Chapter IX, Interscience Publishers, John Wiley & Sons, New York (1964)
(8) Bull. Chem. Soc. Jpn., 61, 1653 (1988)
(9) Pure Appl. Chem., A29 (10), 915 (1992)
(10) Pure Appl. Chem., A30 (2 & amp;3), 189 (1993)
(11) Japanese Patent Application Open to Public Inspection No. 6-16804
(12) DE 10221858
(13) Journal; Bishoff: Chem. Ber. 28 1895; 28 29
(14) Journal; Patemo; GCITA 9; Gazz. Chim. Ital.; 441; 1914;154
(15) Chemical Communications 1969, 12.

Examples of synthesis employed the above-mentioned references are shown below. However, the present invention is not limited to the followings.

Synthesis Example 1

Synthesis of Exemplified Compound 1A: 3,3,4,4-tetramethyl-2,2-diphenyloxetane

A benzene solution containing benzophenone and 2,3-dimethyl-but-2-ene was placed in a photochemical reaction apparatus made of Pyrex (registered trade mark) into which argon gas was sealed, and while stirring, was exposed to ultraviolet radiation for 12 hours, employing a high pressure mercury lamp. Subsequently, after removing the solvent, vacuum distillation was performed, whereby a targeted compound was obtained.

Synthesis Example 2

Synthesis of Exemplified Compound 2A: 3-(2-ethyl-hexyloxymethyl)-2,3,4,4-tetramethyl-oxetane While stirring a 1-bromo-2-ethylhexyl solution of (2,2,3,4-tetramethyl-oxetane-3-yl) and an aqueous potassium hydroxide solution, tetra-n-butylammonium bromide was dripped into it. After 24 hours, methylene chloride and water were added. Subsequently, an organic phase was washed with water, dehydrated by anhydrous magnesium sulfate, and filtered. After removing the solvent, vacuum distillation was performed, whereby a targeted compound was obtained.

Synthesis Example 3

Synthesis of Exemplified Compound 3A: 2-(2-ethyl-hexyloxy)-2,3,3,4,4-pentamethyl-oxetane While stirring a 1-bromo-2-ethylhexyl solution of (2,3,3,4,4-pentamethyl-oxetane-2-ol) and a aqueous potassium hydroxide solution, tetra-n-butylammonium bromide was dripped. After 24 hours, methylene chloride and water were added. Subsequently, the organic phase was washed with water, dehydrated by anhydrous magnesium sulfate, and filtered. After removing the solvent, vacuum distillation was performed, whereby a targeted compound was obtained.

Synthesis Example 4

Synthesis of Exemplified Compound 4A: 4,4'-bis[(2,4-dimethyl-3-ethyl-3-oxetanyl)methoxy]biphenyl While stirring, 3-chloromethyl-3-ethyl-2,4-dimethyl-oxetane, 4,4'-bisphenol, and tetrabutylphosphonium bromide were heated to 80° C. An aqueous potassium hydroxide solution was dripped. The resulting mixture was heated to approximately 110° C. to start reflux. While refluxed, the reaction was allowed to proceed over 8 hours. After the reaction, the reaction mixture was cooled to room temperature. Subsequently, pure water was added and the resulting mixture was well stirred. Thereafter, deposits were collected by filtration. The resulting deposits were washed with water, followed by washing with methanol. Subsequently, drying was performed employing a vacuum dryer, whereby a targeted compound was obtained.

Synthesis Example 5

Synthesis of Exemplified Compound 5A: 1,7-bis(2,3,3,4,4-pentamethyl-oxetanyl)heptane A mixture consisting of 2,12-diethyl-2,12-dimethyl-tridecane-1,3,11,13-tetraol, diethyl carbonate, and potassium carbonate was refluxed until the temperature decreased to less than 120° C. While the resulting mixture was maintained at 80–82° C., vacuum distillation was carried out, whereby a targeted compound was obtained.

Synthesis Example 6

Synthesis of Exemplified Compound 6A: oxetanyl silsesquioxanes

Isopropyl alcohol, an aqueous solution of hydroxydized tetramethylammonim, and water were charged. Thereafter, the oxetane compound, described below, was gradually added and the resulting mixture was allowed to stand at room temperature while stirring for 24 hours. After the reaction, toluene was added to the reaction system and the resulting reaction solution was washed with a saturated sodium chloride solution. Subsequently, washing was repeated until the water layer in the separating funnel became neutral. Subsequently, the organic layer was collected and dehydrated by anhydrous sodium sulfate. Thereafter, toluene was distilled out under vacuum, whereby a targeted compound was obtained.

Further, each synthetic example, described above, relates to an example of the compound in which an electron donating group is substituted at either the 2-position or the 4-position. Such a compound is useful due to high reactivity to oxetane compounds which have no substituent at either the 2-position or the 4-position.

In the present invention, it is preferable that the aforesaid oxetane compounds, which are substituted with an electron attractive group at the 4-position, are further substituted with an electron donating group at the 2-position. It is possible to synthesize oxetane compounds substituted with an electron attractive group, employing the same method as above.

Specific examples of oxetane compounds, having an electron donating group at the 2-position as well as an electron attractive group at the 4-position, are shown below. However, the present invention is not limited thereto.

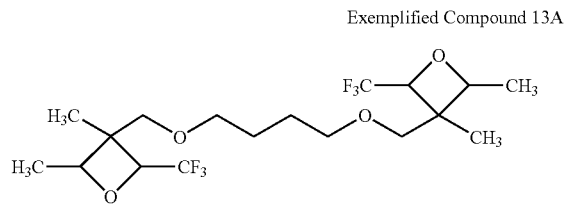

| | $R_1$ | $R_2$ |
|---|---|---|
| Exemplified Compound 7A | —OCH$_3$ | CF$_3$ |
| Exemplified Compound 8A | —O—C$_6$H$_5$ | CF$_3$ |
| Exemplified Compound 9A | —C$_6$H$_4$—OCH$_3$ | CF$_3$ |
| Exemplified Compound 10A | —CH$_3$ | CF$_3$ |
| Exemplified Compound 11A | —C$_6$H$_4$—OCH$_3$ | CF$_2$H |
| Exemplified Compound 12A | —C$_6$H$_4$—OCH$_3$ | CFH$_2$ |

Further, compounds having at least two oxetane groups in the molecule may be provided with multifunction via the 3-position, or either the 2-position or the 4-position of the aforesaid compounds. A specific example of a compound having at least two oxetane groups are shown below. However, the present invention is not limited thereto.

Exemplified Compound 13A

In the oxetane compounds of the present invention, it is preferable that the 3-position has a substituent. Further, it is possible to synthesize the oxetane compounds according to the present invention by following the procedures described in the aforesaid Publications H-L. Further, it is possible to provide multifunctionality to Exemplified Compounds 8A–13A in the same manner as the method described in General Formulas (7A)–(9A).

In the ink-jet ink of the present invention, it is preferable to use an oxetane compound having an electron donating group as well as an electron attractive group in the molecules and having no substituent at the 2-position, together with an oxetane compound having no substituent at the 2-position, since it is possible to dramatically increase the photosensitivity and achieve desired curing in an ambience of high humidity.

As oxetane compounds having no substituent at the position 2, the compounds shown by the following General Formula (1A) are listed.

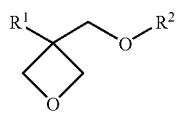

General Formula (1A)

In the General Formula (1A), $R^1$ is a hydrogen atom, alkyl group having 1–6 carbon atoms such methyl group, ethyl group, propyl group or butyl group, fluoro-alkyl group having 1 to 6 carbon atoms, allyl group, aryl group, furyl group, or thienyl group. $R^2$ is an alkyl group having 1 to 6 carbon atoms such as methyl group, ethyl group, propyl group or butyl group; alkenyl group having 2 to 6 carbon atoms such as 1-propenyl group, 2-propenyl group, 2-methyl-1-propenyl group, 2-methyl-2-propenyl group, 1-butenyl group, 2-butenyl group or 3-butenyl group; a group having aromatic ring such as phenyl group, benzyl group, fluoro-benzyl group, methoxy-benzyl group or phenoxy-ethyl group; alkyl carbonyl group having 2 to 6 carbon atoms such as ethyl carbonyl group, propyl carbonyl group or butyl carbonyl group; alkoxy carbonyl group having 2 to 6 carbon atoms such as ethoxy carbonyl group, propoxy carbonyl group or butoxy carbonyl group; N-alkyl carbamoyl group having 2 to 6 carbon atoms such as ethyl carbamoyl group, propyl carbamoyl group, butyl carbamoyl group or pentyl carbamoyl group. As the oxetane compound used in the present invention, it is particularly preferable that the compound having one oxetane ring is used, because the obtained composition is excellent in the coking property, and the operability is excellent in the low viscosity.

Next, as the compound having two oxetane rings, the compounds shown by the following General Formula (2A) are listed.

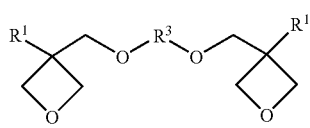

General Formula (2A)

In the General Formula (2A), $R^1$ is the same group as the group shown in the above-described General Formula (1A). $R^3$ is, for example, a linear or branching alkylene group such as ethylene group, propylene group or butylene group; linear or branching poly (alkylene-oxy) group such as poly (ethylene oxy) group or poly (propylene oxy) group; linear or branching un-saturated hydrocarbon group such as propenylene group, methyl propenylene group or butenylene group; carbonyl group; alkylene group including carbonyl group; alkylene group including carboxyl group; alkylene group including carbamoyl group.

Further, $R^3$ may also be a polyhydric group selected from the group shown by the following General Formulas (3A), (4A) and (5A).

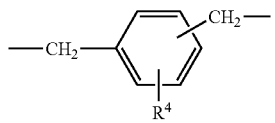

General Formula (3A)

In the General Formula (3A), $R^4$ is a hydrogen atom, an alkyl group having 1 to 4 carbon atoms such as methyl group, ethyl group, propyl group or butyl group, or alkoxy group having 1 to 4 carbon atoms such as methoxy group, ethoxy group, propoxy group or butoxy group, or halogen atom such as chloride atom or bromine atom, nitro group, cyano group, mercapto group, lower alkyl carboxyl group such as the group having 1 to 5 carbon atoms, carboxyl group, or carbamoyl group.

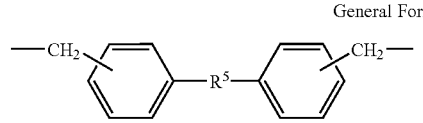

General Formula (4A)

In the General Formula (4A), $R^5$ is oxygen atom, sulfide atom, methylene group, —NH—, —SO—, —SO$_2$—, —C(CF$_3$)$_2$—, or —C(CH$_3$)$_2$—.

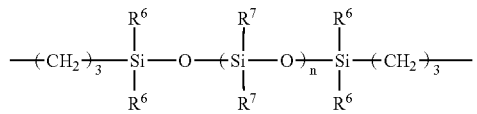

General Formula (5A)

In the General Formula (5A), $R^6$ is an alkyl group having 1 to 4 carbon atoms such as methyl group, ethyl group, propyl group or butyl group, or aryl group. Numeral n is an integer of 0–2000. $R^7$ is an alkyl group having 1 to 4 carbon atoms such as methyl group, ethyl group, propyl group or butyl group, or aryl group. $R^7$ is also a group selected from the group shown by the following General Formula (6A).

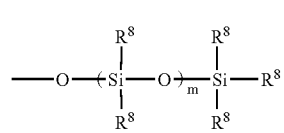

General Formula (6A)

In the General Formula (6A), $R^8$ is an alkyl group having 1 to 4 carbon atoms such as methyl group, ethyl group, propyl group or butyl group, or aryl group. Numeral m is an integer of 0–100.

As a specific example of the compound having 2 oxetane rings, the compounds shown by the following structural formulas are listed.

Exemplified compound 14A

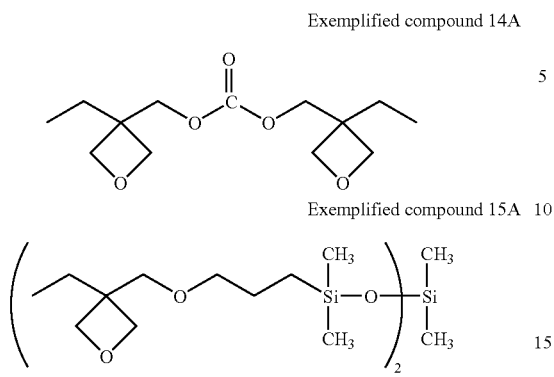

Exemplified compound 15A

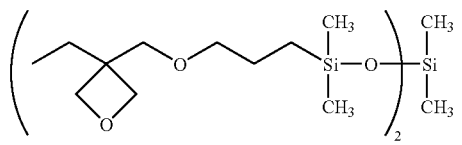

Exemplified compound 14 shown by the above structural formula is a compound in which $R^1$ is an ethyl group, and $R^3$ is a carboxy group in General Formula (2A).

Exemplified compound 15 shown by the above structural formula is a compound in which each $R^6$ and $R^7$ are a methyl group, and n is 1 General Formula (5A).

Among the compound having 2 oxetane rings, as a preferable example except for the above-described compounds, there are compounds shown by the following General Formula (7A). In the General Formula (7A), $R^1$ is the same group as in the General Formula (1A).

General Formula (7A)

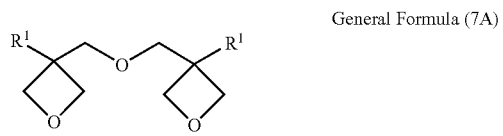

As the compounds having 3–4 oxetane rings, the compounds shown in the following General Formula (8) are listed.

General Formula (8A)

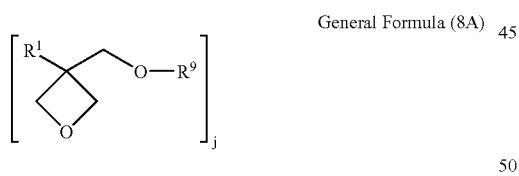

In the General Formula (8A), $R^1$ is the same group as in the General formula (1A). $R^9$ is, for example, branching alkylene group having 1 to 12 carbon atoms such as groups shown by the following General Formulas (9A), (10A), branching poly(alkylene oxy) group such as group shown by the following General Formula (11A), or branching polysiloxane group such as group shown by the following General Formula (12A) is listed. Numeral j is 3 or 4.

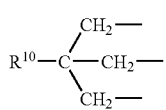

A

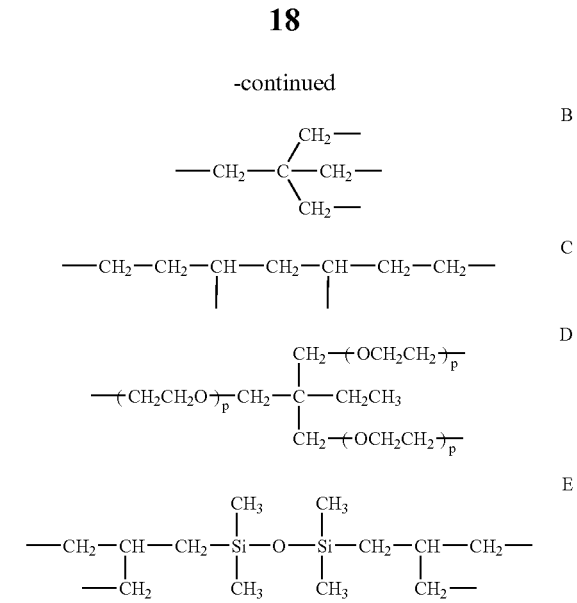

In Formula A, $R^{10}$ is a lower alkyl group such as a methyl, ethyl, or propyl group. In Formula D, p is an integer of 1 to 10.

As the specific example of the compound having 3 to 4 oxetane rings, the compound shown in the following Exemplified compound 16A is cited.

Exemplified compound 16A

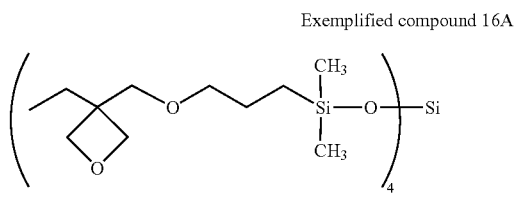

Furthermore, as an example of the compounds having 1–4 oxetane rings except the above examples, there are compounds shown in the following General Formula (9A).

General Formula (9A)

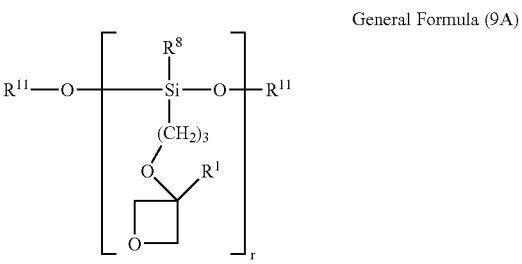

In the General Formula (9A), R1 is the same group as in General Formula (1A) and $R^8$ is the same group as in the General Formula (6A). $R^{11}$ is alkyl group having 1 to 4 carbon atoms such as methyl group, ethyl group, propyl group or butyl group, or tri-alkyl silyl group, and numeral r is 1–4.

As preferable specific examples of the oxetane compounds used in the present invention, there are compounds shown below.

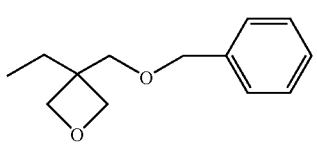

Exemplified compound 17A

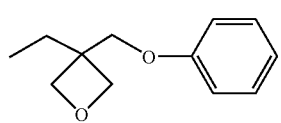

Exemplified compound 18A

Exemplified compound 19A

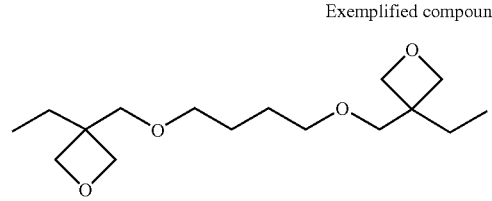

The production method of the compounds having the oxetane ring is not particularly limited, and it may be conducted according to the conventionally known method, and for example, there is a synthetic method of an oxetane ring from diol disclosed by Pattison (D. B. Pattison, J. Am. Chem. Soc., 3455, 79 (1957)).

Further, other than them, compounds having 1–4 oxetane rings, which have high molecular weight of molecular weight of about 1000–5000, are also listed. As an example of them, for example, the following compounds are listed.

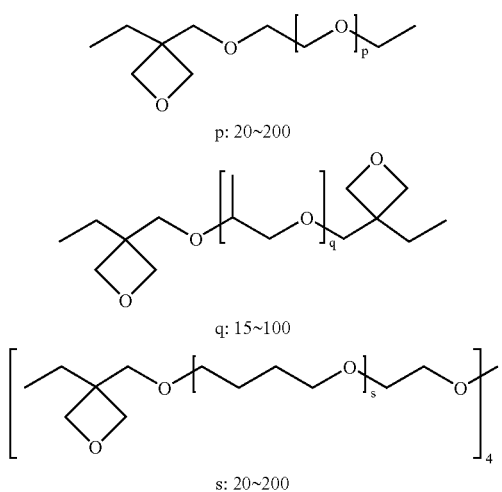

p: 20~200 q: 15~100 s: 20~200

The ink-jet ink of the present invention preferably incorporate an oxetane compound with an epoxy compound or a vinyl compound. The oxetane compound has an electron donating group and an electron withdrawing group in the molecule, and at the same time being substituted at the 2 position of the ring.

(Epoxy Compound)

Among epoxy compounds, referable aromatic epoxy compounds are di- or poly-glycidyl ether, which is synthesized by the reaction of polyhydric phenol having at least one aromatic core or alkylene oxide-added polyhydric phenol and epichlorohydrin, and for example, di- or poly-glycidyl ether of bisphenol A or of alkylene oxide-added bisphenol A, di- or poly-glycidyl ether of hydrogenated bisphenol A or of alkylene oxide-added hydrogenated bisphenol A, and novolak type epoxy resin, are listed. Herein, as alkylene oxide, ethylene oxide and propylene oxide are listed.

As alicyclic epoxide, a cyclohexene oxide or cyclopentene oxide, which is obtained by epoxidation of the compound having cycloalkane ring such as at least one cyclohexene or cyclopentene ring by the appropriate oxidant such as hydrogen peroxide or peracid, is preferable.

As a preferable aliphatic epoxide, there is di- or poly-glycidyl ether of aliphatic polyvalent alcohol or of alkylene oxide-added aliphatic polyvalent alcohol, and as its representative example, di-glycidyl ether of alkylene glycol such as di-glycidyl ether of ethylene glycol, di-glycidyl ether of propylene glycol and glycidyl ether of 1, 6-hexane diol, poly-glycidyl ether of polyvalent alcohol such as di-or tri-glycidyl ether of glycerin or of alkylene oxide added glycerin, and di-glycidyl ether of polyalkylene glycol such as di-glycidyl ether of polyethylene glycol or of alkylene oxide-added polyethylene glycol, and di-glycidyl ether of polypropylene glycol or of alkylene oxide-added polypropylene glycol, are listed. Herein, as alkylene oxide, ethylene oxide and propylene oxide are listed.

In these epoxides, when the quick hardening ability is considered, aromatic epoxide and alicyclic epoxide are preferable, and particularly, alicyclic epoxide is preferable. In the present invention, on kind of the above epoxides may be solely used, and more than 2 kinds of them may also be used by appropriately being combined.

(Vinyl Ether Compound)

Also as a vinyl ether compound preferably used in the ink of the present invention, publicly known vinyl ether compounds can be used, and for example, di or tri-vinyl ether compound, such as ethylene glycol di-vinyl ether, di-ethylene glycol di-vinyl ether, tri-ethylene glycol di-vinyl ether, propylene glycol di-vinyl ether, di-propylene glycol di-vinyl ether, butane diol di-vinyl ether, hexane diol di-vinyl ether, cyclohexane di-methanol di-vinyl ether, tri-methylol propane tri-vinyl ether, or mono vinyl ether compound, such as ethyl vinyl ether, n-butyl vinyl ether, iso-butyl vinyl ether, octadecyl vinyl ether, cyclohexyl vinyl ether, hydroxy butyl vinyl ether, 2-ethyl-hexyl vinyl ether, cyclo-hexane di-methanol mono-vinyl ether, n-propyl vinyl ether, iso-propyl vinyl ether, iso-propenyl ether-o-propylene carbonate, dodecyl vinyl ether, or di-ethylene glycol mono vinyl ether vinyl ether, is listed.

In these vinyl ether compounds, when the hardenability, adhesion or surface hardness is considered, di or tri-vinyl ether compound is preferable, and particularly di-vinyl ether compound is preferable. In the present invention, one kind of the above vinyl ether compounds may also be used, and more than two kinds of them may also be used by being appropriately combined.

One of the features of the ink-jet ink of the present invention is that the ink-jet ink incorporates an oxetane compound with a photo-acid generating agent, the oxetane compound having an electron donating group and an electron withdrawing group in the molecule and at the same time being substituted at the 2 position of the ring.

As the photo initiator, all publicly known photo acid generators (a compound which generates the acid by the active ray, such as ultraviolet rays) can be used. As the photo acid generator, for example, a chemical amplification type photo resist or compound used for the light cationic polymerization is used (Organic electronics material seminar "Organic material for imaging" from Bunshin publishing house (1993), refer to page 187–192). Examples preferable for the present invention will be listed below.

Firstly, aromatic onium compound $B(C_6F_5)_4^-$, $PF_6^-$, $AsF_6^-$, $SbF_6^-$, $CF_3SO_3^-$ salt, such as diazonium, ammonium, iodonium, sulfonium, phosphonium, can be listed. Specific examples of the onium compounds will be shown below.

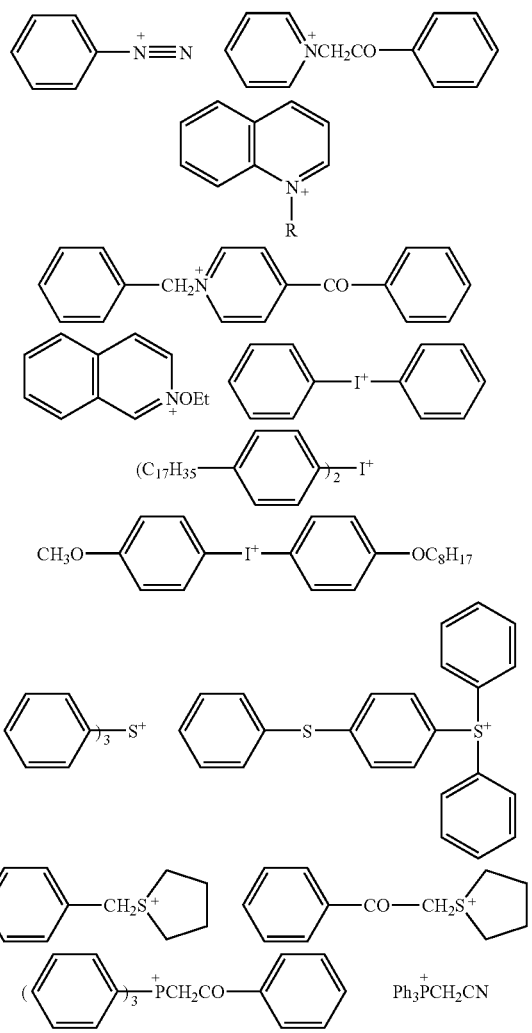

Secondly, sulfone compounds, which generate sulfonic acid, can be listed. Examples of specific compounds will be shown below.

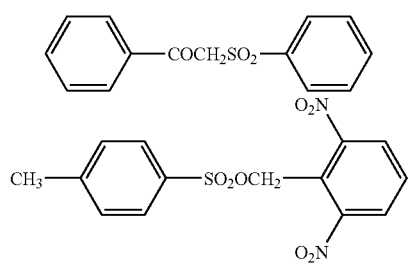

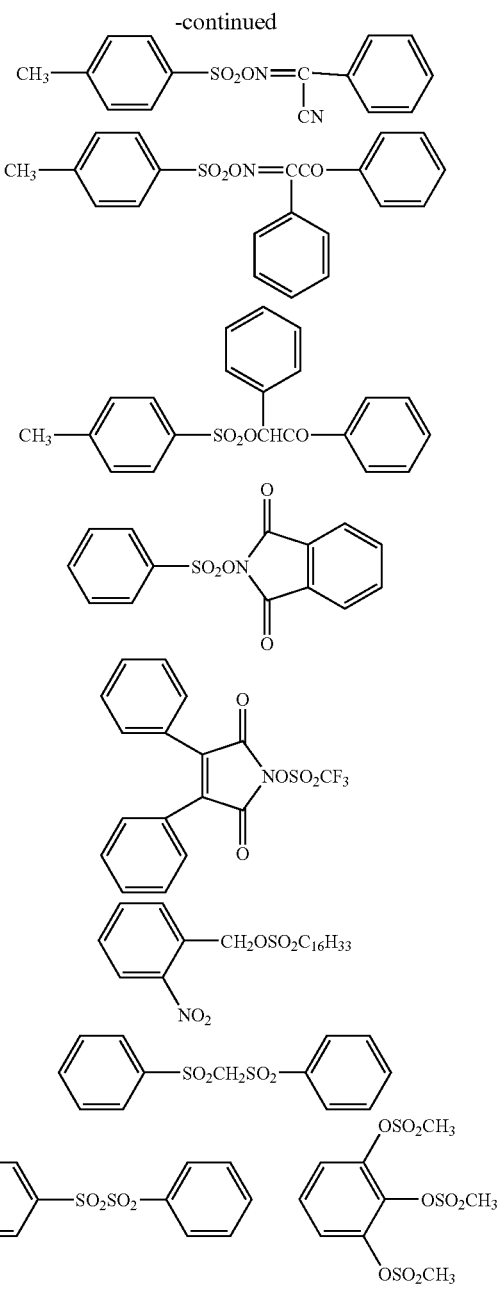

Thirdly, halogenide which generates hydrogen halide can also be used. Examples of specific compounds will be shown below.

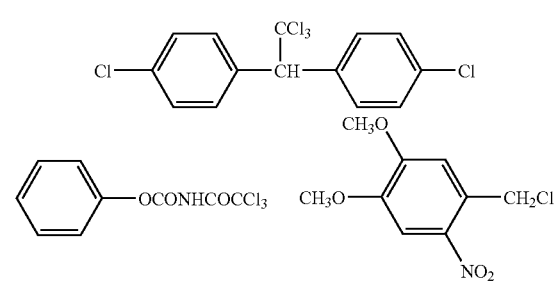

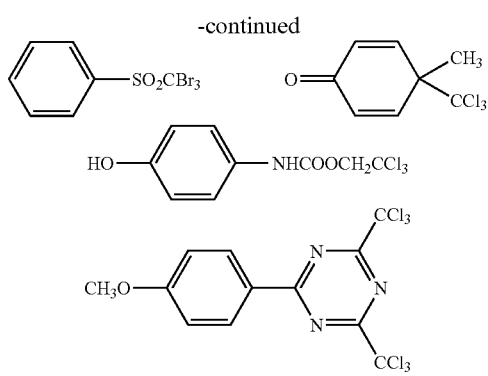

Fourthly, ferrite allene complex can be listed.

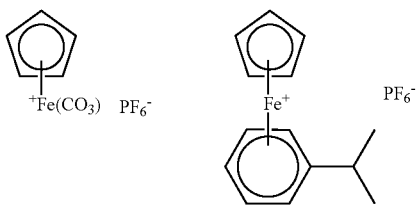

Other than above, other additives can be used in the ink-jet ink of the present invention.

As the colorants in the present invention are, the colorants, which can be solved or dispersed in main component of the polymeric compound, can be used, however, from the viewpoint of weather fastness, the pigment is preferable.

As the pigment, the followings can be used, however, it is not limited to these.

C.I. Pigment Yellow-1, 3, 12, 13, 14, 17, 81, 83, 87, 95, 109, 42,
C. I. Pigment Orange-16, 36, 38,
C. I. Pigment Red-5, 22, 38, 48:1, 48:2, 48:4, 49:1, 53:1, 57:1, 63:1, 144, 146, 185, 101,
C. I. Pigment Violet-19, 23,
C. I. Pigment Blue-15:1, 15:3, 15:4, 18, 60, 27, 29,
C. I. Pigment Green-7, 36
C. I. Pigment White-6, 18, 21,
C. I. Pigment Black-7.

To disperse the pigment, a ball mill, sand mill, attritor, roll mill, agitator, Henschel mixer, colloid mill, ultrasonic homogenizer, Pearl mill, wet jet mill, or paint shaker may be used. Further, when the pigment is dispersed, the dispersing agent can also be added. It is preferable that, as the dispersing agent, high polymeric dispersing agent is used. As the high polymeric dispersing agent, Solsperse series of Avecia co., is cited.

Further, as the dispersion auxiliary agent, the synergist corresponding to each kind of pigment can also be used. It is preferable that 1–50 parts by weight of these dispersing agent and dispersion auxiliary agent are added to 100 parts by weight of the pigment. The dispersion medium is solvent or polymeric compound, and it is preferable that the ultraviolet ray-curable ink used in the present invention comprises no-solvent, because it is reacted and hardened just after the arrival of the ink. When the solvent remains in the hardened image, the problem of deterioration of solvent resistance and VOC (Volatile Organic Compound) of the remained solvent is raised. Accordingly, it is preferable in the dispersion aptitude that the dispersion medium is not solvent, but polymeric compounds, and the monomer in which the viscosity is lowest in them, is selected.

When the dispersion is conducted, it is preferable to configure the pigment, dispersing agent, selection of diluent for the dispersion so that average particle size of the pigment become 0.08–0.5 μm, more preferably 0.3–10 μm, still more preferably, 0.3–3 μm. By this particle size control, the nozzle plugging of the ink-jet head is suppressed, and the preservation stability of the ink, ink transparency and hardening sensitivity can be maintained.

It is preferable for the colorant that the addition amount is 1 weight % to 10 weight % of the whole of the ink.

(The Other Components)

In order to increase the keeping quality of the ink components, the polymerization inhibitor of 200–20000 ppm can be added. Because it is preferable that the ultraviolet ray-curable ink is heated and made to low viscosity, and jetted, it is preferable for preventing the head from plugging by the thermal polymerization that the polymerization inhibitor is added. As the polymerization inhibitor, for example, a basic compound can be added.

In the present invention, for the purpose of enhancing stable ejection as well as stable storage, it is also possible to employ thermal base generating agents.

Preferably employed as thermal base generating agents are, for example, salts of an organic acid and a base which thermally decompose to result in decarboxylation, amine releasing compounds upon being decomposed by reaction such as intramolecular nucleophilic substitution reaction, Lossen rearrangement, and Beckmann rearrangement, and base releasing compounds which undergo various reactions when heated. Specific examples include trichloroaceic acid salts described in British Patent No. 998,949, alpha-sulfonylacetic acid salts described in U.S. Pat. No. 4,060,420, propyl acid salts described in Japanese Patent Publication Open to Public Inspection No. 59-157637, 2-carboxycarboxamide derivatives, basic components described in Japanese Patent Publication Open to Public Inspection No. 59-168440, organic bases, and alkali metals, salts of thermally decomposable acids employing alkaline earth metals, hydroxamcarbamate utilizing the Lossen rearrangement described in Japanese Patent Publication Open to Public Inspection No. 59-180537 and aldoximecarbamates described in Japanese Patent Publication Open to Public Inspection No. 59-195237 which thermally form nitryl. Other than these, thermal base generating agents are useful which are described in British Patent No. 998,945, U.S. Pat. No. 3,220,846, and British Patent No. 279,480, Japanese Patent Publication Open to Public Inspection Nos. 50-22625, 61-32844, 61-51139, 61-52638, 61-51140, 61-53634–61-53640, 61-55644, and 61-55645. More specific examples include trichloroacetic acid guanidine, trichloroacetic acid methyl guanidine, potassium trichloroacetate, phenylsulfonylacetic acid guanidine, p-chlorophenylsulfonylacetic acid guanidine, p-methanesulfonylphenylsulfonylacetic acid guanidine, potassium phenylpropiol acetate, phenylpropiolic acid guanidine, cesium phenylpropiolate, p-chlorophenolpropiolic acid guanidine, p-phenylene-bis-phenylpropiolic acid guanidine, phenylsulfonyl acetic acid tetramethylammonium, and phenylpropiolic acid tetramethylammonium. It is possible to use the aforesaid thermal base generating agents in the wide range.

The ink of the present invention may contain acid increasing agents, known in the art by Japanese Patent Application Open to Public Inspection Nos. 8-248561 and 9-341106, which generate acid, employing acid generated by exposure of actinic radiation.

In the present invention, the surface tension of the ink is preferably in the range of 25–40 mN/m at 25° C. When the surface tension of the ink is less than 25 mN/m at 25° C., it is difficult to achieve stable ink ejection. On the other hand, when it exceeds 40 mN/m, it is extremely difficult to result in the desired dot diameter.

In order to adjust the surface tension, if desired, surface active agents may be incorporated. Examples of surface active agents which are preferably employed in the present invention include anionic surface active agents such as dialkylsulfosuccinic acid salts, alkylnaphthalenesulfonic acid salts, and fatty acid salts; nonionic surface active agents such as polyoxyethylene alkyl ethers, polyoxyethylene alkyl allyl ethers, acetylene glycols, polyoxyethylene-polyoxypropylene block copolymers; cationic surface active agents such as alkylamine salts and quaternary ammonium salts; and surface active agents having a polymerizable group. Of these, specifically preferred are surface active agents having a polymerizable group such as silicon modified acrylate, fluorine modified acrylate, silicon modified epoxy, fluorine modified epoxy, silicon modified oxetane, and fluorine modified oxetane.

Other than that, corresponding to the necessity, the surfactant, leveling additive agent, mat agent, polyester resin for adjusting the film property, polyurethane resin, vinyl resin, acrylic resin, rubber resin, or wax can be added. In order to improve the adhesion to the recording medium, it is also effective that the very fine amount of organic solvent is added. In this case, the addition within the range that the problem of the solvent resistance or VOC is not generated, is effective, and the amount is 0.1–5 weight %, preferably 0.1–3 weight % of total ink weight.

In the image forming method of the present invention, an ink composition is ejected onto a recording material to form images. Subsequently, the resulting ink composition is exposed to actinic radiation such as ultraviolet radiation to cure the ink.

In the image forming method of the present invention, it is preferable to decrease the viscosity of a liquid ink composition by heating the liquid ink composition as well as the nozzle(s) during ink ejection. The heating temperature is commonly 30–80° C., but is preferably 35–60° C.

In the present invention, the thickness of the total ink layer after curing while exposed to actinic radiation is preferably 2–20 μm. In the actinic radiation curable ink-jet recording in the screen printing field, at present, the ink layer thickness exceeds 20 μm. As a result, the aforesaid ink-jet recording is not applicable to the soft package printing field due to the following. Since thin plastic materials are frequently used as a recording material, the aforesaid problems of curling as well as wrinkling occur. In addition, the stiffness and feel of quality of the entire printed materials are adversely affected. In the present invention, the volume of a liquid droplet ejected from each nozzle is preferably 2–15 pl.

In the present invention, in order to enable formation of highly detailed images, it is preferable that exposure duration is as short as possible. However, in the present invention, it is preferable to initiate radiation exposure at the time when either the ink viscosity or the water content ratio reaches the desired value.

In more detail, as to the radiation exposure conditions, it is preferable to initiate actinic radiation exposure 0.001–2.0 seconds after ink impingement, and is more preferably to initiate it 0.001–0.4 second. Further, it is preferable to finish the exposure after 0.1–3.0 seconds, preferably within 0.2–1.0 second, so that radiation exposure is carried out at a level in which ink fluidity is almost lost. By setting the conditions as above, it is possible to minimize the increase in dot diameter as well as bleeding between dots.

Disclosed as actinic radiation exposure methods is a basic method in Japanese Patent Application Open to Public Inspection No. 60-132767. According to the aforesaid patent, light sources are arranged on both sides of a recording head unit, and the recording head as well as the light sources is scanned employing a shuttle system. Exposure is performed a definite time after ink impingement. Further, curing is finished employing another light source which is not driven. U.S. Pat. No. 6,145,979 discloses a method in which optical fibers are employed as an exposure method and in addition, a method in which UV radiation is exposed to a recording section while collimated radiation is incident to a mirror's surface provided on the side surface of a recording head unit. In the image forming method of the present invention, the above methods are available.

Further, the following method is also one of the preferable embodiments. Actinic radiation exposure is divided into two steps. Initially, while employing the aforesaid method, actinic radiation is exposed between 0.001–2.0 seconds after ink impingement. After finishing all printing, further the resulting printing is exposed to actinic radiation. By dividing actinic radiation exposure into two steps, it is possible to minimize contraction of recording materials which occurs during curing the ink.

Examples of light sources employed in actinic radiation exposure include high pressure mercury lamps, metal halide lamps, non-electrode UV lamps, low pressure mercury lamps, UV lasers, xenon flash lamps, insectivorous lamps, black-light lamps, insecticide lamps, cold cathode tubes, and LEDs. The aforesaid light sources are not limited to these examples. However, of these, fluorescent tubes are preferred due to low energy consumption as well as low cost. From the viewpoint of sensitivity, preferred are radiation sources which emit radiation at a wavelength of 250–370 nm, and preferably having an emission peak of 270–320 nm. The illuminance is preferably 1–3,000 W/cm$^2$, and is more preferably 1–200 W/cm$^2$.

As supports for the present invention, various types of non-absorptive supports can be used other than common coated paper and non-coated paper. Among them, preferably used are non-absorptive supports.

Examples of non-absorptive supports are various types of plastic films including PET (polyethylene terephthalate) film, OPS (oriented polystyrene) film, OPP (oriented polypropylene) film, ONy (oriented nylon) film, PVC (polyvinyl chloride) film, PE film, and TAC film. Employed as other plastic films may be polycarbonate, acrylic resins, ABS, acetal, PVA, and rubber. Further, metal and glass may also be employed.

Of these recording materials, when images are formed specifically on PET film, OPS film, OPP film, ONy film, or PVC film which are thermally shrinkable, the effects of the present invention are more pronounced. These substrates tend to curl and deform due to contraction during ink curing and heat generated during the curing reaction. In addition, it is difficult for the ink layer to keep up with contraction of the aforesaid substrate.

The surface energy values of the aforementioned plastic films different from each other. It has been a problem that a dot diameter after ink-jetting varies depending on the recording materials. The preferred composition of the present invention includes OPP film and OPS film having a low surface energy and PET film having a relatively large surface energy. The preferred supports have a wettability index of 40 to 60 mN/m.

In the present invention, form the viewpoint of the cost of recording materials such as packaging cost as well as production cost, print production efficiency, and compatibility with prints of various sizes, it is more advantageous to used long (web) recording materials.

EXAMPLES: A

The present invention will now be described with reference to examples. However, the embodiments of the present invention are not limited thereto.

<<Preparation of Ink-jet Ink>>

(Preparation of Magenta Ink 1A)

Magenta Ink 1A comprising the composition described below was prepared as follows. A mixture of components except for a photolytically acid generating agent was dispersed for 4 hours, employing a sand grinder. Thereafter, the photolytically acid generating agent was added. After filtering the resulting mixture employing a 0.8 μm pore membrane filter, vacuum dehydration was carried out while heated to 50° C., whereby Magenta Ink 1A was prepared.

| | |
|---|---|
| C.I. Pigment Red 184 | 3 weight parts |
| Oxetane compound (Exemplified Compound 9) | 100 weight parts |
| Solsperse 24000 (manufactured by Avecia) | 1 weight part |
| UVI-6990 (photolytically acid generating agent, manufactured by Dow Chemicals) | 5 weight parts |

(Preparation of Magenta Ink 2A)

Magenta Ink 2A was prepared in the same manner as aforesaid Magenta Ink 1A, except that the composition was varied as described below.

| | |
|---|---|
| C.I. Pigment Red 184 | 3 weight parts |
| Oxetane compound (Exemplified Compound 9A) | 30 weight parts |
| Aron oxetane OXT-221 (manufactured by TOAGOSEI Co., Ltd.) | 30 weight parts |
| Aron oxetane OXT-211 (manufactured by TOAGOSEI Co., Ltd.) | 20 weight parts |
| Celoxide 2021P (manufactured by Daiseru UCB) | 20 weight parts |
| Solsperse 24000 (manufactured by Avecia) | 1 weight part |
| UVI-6990 (photolytically acid generating agent, manufactured by Dow Chemicals) | 5 weight parts |

(Preparation of Magenta Ink 3)

Magenta Ink 3 was prepared in the same manner as aforesaid Magenta Ink 1, except that the composition was varied as described below.

| | |
|---|---|
| C.I. Pigment Red 184 | 3 weight parts |
| Oxetane compound (Exemplified Compound 9A) | 50 weight parts |
| Aron oxetane OXT-221 (manufactured by TOAGOSEI Co., Ltd.) | 50 weight parts |
| Solsperse 24000 (manufactured by Avecia) | 1 weight part |
| UVI-6990 (photolytically acid generating agent, manufactured by Dow Chemicals) | 5 weight parts |

(Preparation of Magenta Ink 4)

Magenta Ink 4A was prepared in the same manner as aforesaid Magenta Ink 1A, except that the composition was varied as described below.

| | |
|---|---|
| C.T. Pigment Red 184 | 3 weight parts |
| Oxetane Compound A | 50 weight parts |
| Aron oxetane OXT-221 (manufactured by TOAGOSEI Co., Ltd.) | 50 weight parts |
| Solsperse 24000 (manufactured by Avecia) | 1 weight part |
| UVI-6990 (photolytically acid generating agent, manufactured by Dow Chemicals) | 5 weight parts |

Oxetane Compound A

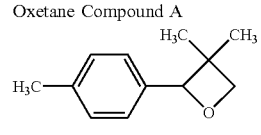

<<Ink-jet Image Recording and Evaluation>>

By employing each of the magenta inks prepared as above, image recording as well as evaluation of the resulting images was carried according to the methods described below.

(Image Evaluation A)

(Image Recording)

Each of the magenta inks prepared as above was ejected onto a polyethylene terephthalate film substrate, which had been subjected to corona discharge treatment, employing piezo type ink-jet nozzles (having a nozzle pitch of 360 dpi; dpi, as described in the present invention, refers to the number of dots per inch or 2.54 cm) capable of forming a droplet volume of 7 pi, while heating the nozzle section to 50° C., whereby a solid magenta image and 6-point MS Ming-cho type characters were printed. Employed as a light source was a fluorescent tube having a 308 nm peak. While adjusting the illuminance on the substrate surface below the light source at 10 mW/cm², exposure was initiated 0.2 second and completed 0.7 second after ink impingement. Incidentally, the exposure energy was 5 mJ/cm². The aforesaid image printing was performed at a low humidity ambience (25° C. and 20 percent relative humidity) as well as at a high humidity ambience (25° C. and 80 percent relative humidity).

(Image Evaluation)

Each image prepared as above was subjected to the evaluation described below.

<Evaluation of Ink Curability>

The ink curability of each of the images printed under different ambiences was evaluated based on the criteria below.

A: No tackiness was noted by touching the image immediately after exposure

B: Slight tackiness was noted by touching the image immediately after exposure, but no tackiness was noted one minute after exposure C: Tackiness was noted even one minute after exposure <Evaluation of Substrate Adhesion Property>

On the solid image formed under different ambiences, 25 mm wide Cellotape (registered trade mark) was adhered and uniformly pressed. Thereafter, the adhered Cellotape was rapidly pulled at a peeling angle of 90 degrees and the state of the images after peeling was visually observed. The substrate adhesion property was then evaluated based on the criteria below.

A: No image was peeled away by pulling the tape

B: Some part of the image was peeled away by pulling the tape

C: The entire contacted image was peeled away by pulling the tape

<Evaluation of Image Bleeding Resistance>

The 6-point MS Ming-cho type characters formed under different ambiences were observed employing a common magnifying glass. The state of dots adjacent to each other was observed and the image bleeding resistance was evaluated based on the criteria below.

A: Almost no bleeding was noticed between two dots

B: Slight bleeding was noticed between two dots

C: Dots were suffered from marked bleeding

Table 1A shows the results.

TABLE 1A

| Ink No. | Printing Ambience (% RH) | Ink Curability | Substrate Adhesion Property | Image Bleeding Resistance | Remarks |
|---|---|---|---|---|---|
| 1A | 20 | B | A | A | Present Invention |
| 1A | 80 | B | A | A | Present Invention |
| 2A | 20 | A | A | A | Present Invention |
| 2A | 80 | A | A | A | Present Invention |
| 3A | 20 | A | A | A | Present Invention |
| 3A | 80 | A | B | A | Present Invention |
| 4A | 20 | B | B | B | Comparative Example |
| 4A | 80 | C | C | C | Comparative Example |

(Image Evaluation B)

Image recording and evaluation were carried out in the same manner as for aforesaid Image Evaluation A, except that exposure initiating time after printing ink was varied to 0.6 second and the exposure completing time was varied to 1.1 seconds. Table 2A shows the results.

TABLE 2A

| Ink No. | Printing Ambience (% RH) | Ink Curability | Substrate Adhesion Property | Image Bleeding Resistance | Remarks |
|---|---|---|---|---|---|
| 1A | 20 | A | A | B | Present Invention |
| 1A | 80 | B | B | B | Present Invention |
| 2A | 20 | A | A | A | Present Invention |
| 2A | 80 | A | A | B | Present Invention |
| 3A | 20 | A | A | A | Present Invention |
| 3A | 80 | A | A | B | Present Invention |
| 4A | 20 | B | B | C | Comparative Example |
| 4A | 80 | C | C | C | Comparative Example |

As can clearly be seen from Tables 1A and 2A, inks comprising the oxetane compound of the present invention, having an electron donating group as well as an electron attractive group in the molecule, in which the 2-position is substituted, were capable of forming high quality images without bleeding which exhibited excellent ink curability as well as excellent substrate adhesion property under a high humidity ambience and various exposure ambiences, compared to the comparative examples. Further, it is also seen that by employing the oxetane compound having no substituent at the 2-position together with the oxetane compound in which the 2-position is substituted, the resulting reactivity increased whereby the effects of the present invention were markedly enhanced.

<<Recording Apparatus>>

The recording apparatus employed in the present invention will now be described.

The recording apparatus employed in the present invention will now be described with reference to a drawing when deemed necessary. Further, the recording apparatus in the drawing is one of the embodiments employed in the present invention, but the recording apparatus employed in the present invention is not limited thereto.

FIG. 1 is a front view showing the structure of the main section of the recording apparatus employed in the present invention. Recording apparatus 1 is comprised of head carriage 2, recording head 3, illumination means 4, and platen section 5. Platen section 5 exhibits an ultraviolet radiation absorbing function and absorbs extra ultraviolet radiation which has been transmitted through recording material P. As a result, it is possible to very consistently reproduce highly fine and detailed images.

Recording material P is guided by guide member 6 and moves from the front to the back of FIG. 1, utilizing operation of a transport means (not shown). A head scanning means (also not shown) allows head carriage 2 to reciprocate in the Y direction shown in FIG. 1 whereby scanning of recording head 3, held by head carriage 2, is carried out.

Head carriage 2 is arranged above recording material P, and houses a plurality of recording heads 3, described below, matching the number of colors employed for printing images onto recording material P so that ink ejection openings are arranged on the lower side. Head carriage 2 is arranged in the main body of recording apparatus 1 in such manner that reciprocal motion is allowed in the Y direction in FIG. 1. driven by the head scanning means.

Incidentally, FIG. 1 shows that head carriage 2 houses yellow (Y), magenta (M), cyan (C), and black (K) recording heads 3. However, in practice, the number of colors of recording head 3, which are housed in carriage 2, is decided on a need basis.

Recording heads 3 eject a photocurable ink (also called an actinic radiation curable ink such as an ultraviolet radiation curable ink), which is supplied by an ink supply means (not shown), onto recording material P from ejection openings, utilizing operation of a plurality of ejection means (also not shown) arranged in its interior. The ultraviolet radiation curable ink (also called UV ink), which is ejected from recording heads 3, is comprised of colorants, polymerizable monomers, initiators, and the like. When exposed to ultraviolet radiation, the aforesaid initiators work as a catalyst, whereby curing properties are exhibited through crosslinking and polymerization reaction of the aforesaid monomers.

During scanning in which recording heads 3 move from one end of recording material P to the other end thereof along the Y direction in FIG. 1, while driven by the head scanning means, aforesaid recording heads 3 eject the aforesaid UV ink in the form of ink droplets onto a definite region (an ink droplet receivable area) of recording material P and impinge ink droplets onto the aforesaid ink droplet receivable area.

The aforesaid scanning is carried out at a suitable frequency. The aforesaid UV ink is ejected onto the ink droplet receivable region. Thereafter, recording material P is appropriately conveyed from the front to the back of FIG. 1, employing a conveying means, and scanning is again carried out employing the head scanning means. During the aforesaid scanning, the aforesaid UV ink is ejected onto the following ink droplet receivable region adjacent to the backward direction of FIG. 1, while employing recording heads 3.

The aforesaid operation is then repeated. By ejecting the aforesaid UV ink from recording heads 3 while synchronizing the head scanning means with the conveying means, an image comprised of an assembly of UV ink droplets is formed on recording material P.

Exposure means 4 is comprised of an ultraviolet radiation lamp which emits ultraviolet radiation of a specified wavelength region at consistent exposure energy, and a filter which transmits the ultraviolet radiation of the specified wavelength. Herein, employed as ultraviolet radiation lamps may be mercury lamps, metal halide lamps, excimer lasers, ultraviolet lasers, cold cathode tubes, black-light lamps, and LEDs (light emitting diodes). Of these, preferred are band-shaped metal halide lamp tubes, cold cathode tubes, mercury lamps, or black-light lamps. Specifically, preferred are cold cathode tubes and black-light lamps which emit ultraviolet radiation of a wavelength of 365 nm, because bleeding is minimized, dot diameter is efficiently controlled, and wrinkling during curing is minimized. By employing the black light lamp as a radiation source of exposure means 4, it is possible to prepare exposure means 4 to cure the UV ink at a lower cost.

Exposure means 4 is shaped to be nearly equal to the maximum one which can be set by recording apparatus (being a UV ink-jet printer) 1 of the ink dot receivable region in which the UV ink is ejected during one frequency of scanning in which recording heads 3 are driven by the head scanning means, or is shaped to be larger than the ink dot receiving region.

Exposure means 4 are arranged and fixed on both sides of head carriage 2, being nearly parallel to recording material P.

As noted above, as a means to control illuminance in the ink ejection section, needless to say, entire recording heads 3 are shielded from light. In addition, it is effective that distance h2 between ink ejection section 31 of recording heads 3 and recording material P is adjusted to be greater than distance h1 between exposure means 4 and recording material P (i.e., h1<h2) and/or distance d between recording heads 3 and exposure means 4 increases (d increases). Further, it is more preferable that bellows structure 7 is applied between recording heads 3 and exposure means 4.

Herein, it is possible to suitably change the wavelength of ultraviolet radiation which is exposed employing exposure means 4 by replacing ultraviolet radiation lamps or filters fitted with exposure means 4.

Other than common coated paper and non-coated paper, employed as recording materials may be various types of non-absorptive plastics and film thereof which are employed in so-called soft packaging. Examples of various types of plastic film include PET (polyethylene terephthalate) film, OPS (oriented polystyrene) film, OPP (oriented polypropylene) film, ONy (oriented nylon) film, PVC (polyvinyl chloride) film, PE film, and TAC film. Employed as other plastic film may be polycarbonate, acrylic resins, ABS, acetal, PVA, and rubber. Further, metal and glass may also be employed.

Of these recording materials, when images are formed specifically on PET film, OPS film, OPP film, ONy film, or PVC film which are thermally shrinkable, the effects of the present invention are more pronounced. These substrates tend to curl and deform due to contraction during ink curing and heat generated during the curing reaction. In addition, it is difficult for the ink layer to keep up with contraction of the aforesaid substrate.

In the present invention, form the viewpoint of the cost of recording materials such as packaging cost as well as production cost, print production efficiency, and compatibility with prints of various sizes, it is more advantageous to used long (web) recording materials.

<<Exposure Apparatus and Types of Light (electromagnetic radiation) Employed for Light Exposure>>

Photocurable ink according to the present invention is cured when exposed to light. Preferably employed as the aforesaid light (also called electromagnetic radiation) are near infrared radiation, visible light, ultraviolet radiation, and electron beams. Of these, the ultraviolet radiation is most preferably employed.

Preferably employed as exposure light sources which emit ultraviolet radiation during exposure, i.e., which emit radiation having wavelengths in the ultraviolet region, are exposure light sources having a peak wavelength (also called dominant wavelength) of 300–400 nm. Of these, specifically preferred are those which emit ultraviolet radiation at a peak wavelength of 200–420 nm.

Examples of exposure light sources include low and high pressure mercury lamps, metal halide lamps, excimer lamps, xenon lamps, halogen lamps, fluorescent lamps, electrode-free UV lamps, lasers, and LEDs.

(Input Energy Amount to Exposure Light Source)

Exposure means employed for light exposure according to the present invention may be arranged parallel to the nozzle arrangement of the head of the recording apparatus shown in FIG. 1, or in the direction across the width of the substrate.

In the invention described in claim 1, in order to achieve the effects described in the present invention, essential conditions are that the input energy amount to the light source for the aforesaid exposure is 0.1–50 W/cm, and is preferably 0.1–20 W/cm. Further, the distance from the substrate to the light emitting surface of the light source is preferably 0.1 mm–20 cm.

In the present invention, when the energy input amount to the light source employed for light exposure is less than 0.1 W/cm, photocurable ink compositions are not sufficiently cured. On the other hand, when the aforesaid input energy amount exceeds 50 W/cm, problems such as cracking tend to result due to curing contraction on the ink surface formed on a recording medium after impingement of the photocurable ink.

Herein, it is possible to adjust the aforesaid input energy amount by controlling voltage and electric current, using conventional constant-voltage power supplies, known in the art. It is possible to measure the aforesaid input energy amount employing, for example, UIT-150 (manufactured by Ushio Denki Co.).

(Time between Ink Impingement and Light Exposure)

The preferred light exposure method in the present invention is that a light source is arranged across the printing width and ultraviolet radiation is applied a definite period of time after ink impingement.

In the image forming method described in claim 2 of the present invention, from the viewpoint of minimizing head staining due to sublimated materials formed by curing, as well as minimizing nozzle clogging due to stray light, and minimizing degradation of image quality due to fluctuation of the dot shape caused by variations of the substrate, light exposure is carried out 0.001–2 seconds after ink impingement and is more preferably 0.01–1 second.

(Measurement of Time between Ink Impingement and Light Exposure)

In the case of an exposure method having a gradient of illuminance in the exposed area, the time between the ink impingement and the exposure is measured in such manner that when illuminance reaches at least $1/10$ of the maximum illuminance, the resulting time is regarded as the exposure initiating time.

EXAMPLES: B

The present invention will now be specifically described with referenced to examples. However, the present invention is not limited thereto.

Example 1B

<<Preparation of Ink Composition>>

Tables 1B–4B show Ink Composition Sets (also simply called Ink Sets) 1B–4B, while Table 5B shows Comparative Ink Composition Set 5B. Further, each of the numerical figures shown in Tables 1B–5B refer to parts by weight in the ink compositions.

Incidentally, ink was prepared employing methods commonly known in the art of this industry.

TABLE 1B

| Ink Composition Set 1B | | K | C | M | Y |
|---|---|---|---|---|---|
| Colorant | | Colorant 1 | Colorant 2 | Colorant 3 | Colorant 4 |
| (% by weight) | | 2.5 | 2.5 | 2.5 | 2.5 |
| Position 2 Substituted Oxetane Compound | 2-methoxy-3,3-dimethyl-oxetane | 100 | 100 | 100 | 100 |
| OXT221 (Comparative Oxetane) | | — | — | — | — |
| Celoxide 2021P (Photopolymerizable Compound) | | — | — | — | — |
| CI-5102 | | 5 | 5 | 5 | 5 |
| CS-7102 | | 1 | 1 | 1 | 1 |

TABLE 2B

| Ink Composition Set 2B | | K | C | M | Y |
|---|---|---|---|---|---|
| Colorant | | Colorant 1 | Colorant 2 | Colorant 3 | Colorant 4 |
| (% by weight) | | 2.5 | 2.5 | 2.5 | 2.5 |
| Position 2 Substituted Oxetane Compound | 2-methoxy-3,3-dimethyl-oxetane | 30 | 30 | 30 | 30 |
| OXT221 (Comparative Oxetane) | | 40 | 40 | 40 | 40 |
| Celoxide 2021P (Photopolymerizable Compound) | | 30 | 30 | 30 | 30 |
| CI-5102 | | 5 | 5 | 5 | 5 |
| CS-7102 | | 1 | 1 | 1 | 1 |

TABLE 3B

| Ink Composition Set 3B | | K | C | M | Y |
|---|---|---|---|---|---|
| Colorant | | Colorant 1 | Colorant 2 | Colorant 3 | Colorant 4 |
| (% by weight) | | 2.5 | 2.5 | 2.5 | 2.5 |
| Position 2 Substituted Oxetane Compound | 2,2,3,3-tetramethyl-oxetane | 100 | 100 | 100 | 100 |
| OXT221 (Comparative Oxetane) | | — | — | — | — |
| Celoxide 2021P (Photopolymerizable Compound) | | — | — | — | — |
| CI-5102 | | 5 | 5 | 5 | 5 |
| CS-7102 | | 1 | 1 | 1 | 1 |

TABLE 4B

| Ink Composition Set 4B | | K | C | M | Y |
|---|---|---|---|---|---|
| Colorant | | Colorant 1 | Colorant 2 | Colorant 3 | Colorant 4 |
| (% by weight) | | 2.5 | 2.5 | 2.5 | 2.5 |
| Position 2 Substituted Oxetane Compound | 2-methoxy-3,3-dimethyl-oxetane | 50 | 50 | 50 | 50 |
| OXT221 (Comparative Oxetane) | | 50 | 50 | 50 | 50 |

TABLE 4B-continued

| Ink Composition Set 4B | K | C | M | Y |
|---|---|---|---|---|
| Celoxide 2021P (Photopolymerizable Compound) | — | — | — | — |
| CI-5102 | 5 | 5 | 5 | 5 |
| CS-7102 | 1 | 1 | 1 | 1 |

TABLE 5B

| Ink Composition Set 5B (Comparative) | K | C | M | Y |
|---|---|---|---|---|
| Colorant (% by weight) | Colorant 1 2.5 | Colorant 2 2.5 | Colorant 3 2.5 | Colorant 4 2.5 |
| Position 2 Substituted Oxetane Compound | — | — | — | — |
| OXT221 (Comparative Oxetane) | 70 | 70 | 70 | 70 |
| Celoxide 2021P (Photopolymerizable Compound) | — | — | — | — |
| CI-5102 | 5 | 5 | 5 | 5 |
| CS-7102 | 1 | 1 | 1 | 1 |

Each of the compounds described in Tables 1B–5B is detailed below.
K: concentrated black ink
C: concentrated cyan ink
M: concentrated magenta ink
Y: concentrated yellow ink
Colorant 1: C.I. Pigment Black-7
Colorant 2: C.I. Pigment Blue-15:3
Colorant 3: C.I. Pigment Red-57:1
Colorant 4: C.I. Pigment Yellow-13
Photopolymerizable Compound: Celoxide 2021P, manufactured by Daiseru Kagaku Kogyo Co.
Oxetane Compound: OXT221, manufactured by Toa Gosei Kagaku Co.
CI-5102: a product manufactured by Nihon Soda Co.
CS-7102: anthracene derivative, manufactured by Nihon Soda Co.

Each of Ink Composition Sets, prepared as above, was loaded in the ink-jet recording apparatus, shown in FIG. 1, which was fitted with piezo type ink nozzles. Each image recording, described below, was continuously carried out on each of 600 mm wide 1,000 m long recording materials. The ink supply system was comprised of an ink tank, a supply pipe, a pre-chamber ink tank immediately prior to the head, piping fitted with filters, and a piezoelectric head. The aforesaid ink supply system was heated to 50° C., while the system from the pre-chamber tank to the head portion was insulated from heat. The aforesaid piezo head was driven to eject multi-size dots of 2–15 pl at a resolution of 720 dpi×720 dpi (dpi refers to the number of dots per inch or per 2.54 cm) and each ink was continuously ejected. Curing was conducted out 0.2 second after ink impingement at exposure timing (light exposure conditions) described in Table 6B, whereby Ink-jet Image Recorded Samples (also simply called Samples) 1B–6B were prepared.

Further, in the recording apparatus described in Table 1B, it is possible to regulate the amount of light exposure energy onto the ink surface by varying the distance between the head and the exposure light source as well as the conveying rate of the media.

<<Evaluation of Ink-jet Image Recorded Samples 1B–6B>>

Ink-jet Image Recorded Samples 1B–6B were subjected to evaluation of scratch resistance as well as adhesion properties, as described below.

<<Evaluation of Scratch Resistance>>

The surface of each solid image patch was scanned employing a Scratch Resistance Tester (HEIDON-18, manufactured by HEIDON Co.). Scanning was carried out employing a 1.00 mmR sapphire needle while varying the load from 0 to 200 g. The lowest weight which resulted in scratches was determined and the average value of four colors (K, M, Y, and C) was determined.

<<Evaluation of Adhesion Property>>

The surface of a solid printed image was subjected to cutting of 6 longitudinal lines and 6 lateral lines, employing a razor so that cutting depth did not reach the recording medium, whereby 25 squares were formed. Subsequently, 25 mm wide Cellotape Tape (registered trade mark) or cellophane tape was adhered onto the resulting squares and sufficiently pressed. Thereafter, the cellophane tape was rapidly peeled at a peeling angle of 90 degrees and the number of squares which exhibited peeling was determined. Evaluation was ranked as A–E, and carried out based on the criteria described below.

In the following ranks, A and B were judged to be commercially viable.

A: No square exhibited peeling
B: 1–3 squares exhibited peeling
C: 4–10 squares exhibited peeling
D: 11–25 squares exhibited peeling
E: At least 26 squares exhibited peeling Table 6 shows the evaluation results.

TABLE 6B

| Ink-jet Image Recorded Sample No. | Ink Set | Exposure Apparatus | Input Power W/cm | Scratch Resistance | Adhesion Property | Re- marks |
|---|---|---|---|---|---|---|
| 1B | 1B | black-light | 0.4 | 120 | A | Inv. |
| 2B | 2B | black-light | 0.4 | 150 | A | Inv. |
| 3B | 3B | black-light | 0.4 | 130 | A | Inv. |
| 4B | 4B | black-light | 0.4 | 130 | A | Inv. |
| 5B | 5B | black-light | 0.4 | 50 | B | Comp. |
| 6B | 1B | high pressure mercury | 100 | 50 | C | Comp. |

Inv.; Present Invention
Comp.; Comparative Example

As can clearly be seen from Table 6B, Samples 1B–4B in which ink-jet images were formed employing the ink comprising a compound having an oxetane ring in which at least position 2 was substituted while the input energy amount to the light source used for exposure was maintained in the range of 0.1–50 W/cm, exhibited high scratch resistance of the resulting ink surface (also called an ink-jet image surface) and excellent adhesion property, compared to Samples 5B and 6B which were not prepared as above.

Example 2B

Ink Composition Sets 1B–5B were prepared in the same manner as Example 1B. Subsequently, ink-jet images were formed in the same manner as Example 1B, except that exposure timing was varied as described in Table 7B, while setting the light exposure amount at 10 mJ/cm$^2$. Resulting Ink-jet Image Recorded Samples 7B–13B were subjected to each of the evaluation described below.

The light exposure amount was determined employing UV40D/V (manufactured by Ushio Denki Co.).

<<Character Quality>>

At the target density of each of colors Y, M, C, and K, 6-point MS Ming-style characters were printed and jaggedness of characters was evaluated employing a common magnifying glass.

A: No jaggedness was noticed
B: Slight jaggedness was noticed
C: Jaggedness was noticed but characters were identifiable, resulting in the lower limit for commercial viability
D: Jaggedness was pronounced, resulting in no commercial viability due to blurring of characters <<Color Mixing (Bleeding)>>

Dots of each color, adjacent to each other, were visually evaluated employing a common magnifying glass.

A: The shapes of dots adjacent to each other were circular, resulting in no bleeding
B: The shapes of dots adjacent to each other were nearly circular, exhibiting almost no bleeding
C: Dots adjacent to each other exhibited slight bleeding and the dot shapes were slightly deformed, resulting in the lower limit for commercial viability
D: Dots adjacent to each other exhibited bleeding and mixing, resulting in a commercially unviable product Table 7B shows the results.

TABLE 7B

| Ink-jet Image Recorded Sample No. | Ink Set | Exposure Apparatus | Exposure Timing | Character Quality | Bleeding | Remarks |
|---|---|---|---|---|---|---|
| 7B | 1B | black-light | 0.4 second | A | A | Inv. |
| 8B | 2B | black-light | 0.4 second | A | A | Inv. |
| 9B | 3B | black-light | 0.4 second | A | A | Inv. |
| 10B | 4B | black-light | 0.4 second | A | A | Inv. |
| 11B | 1B | high pressure mercury | 0.4 second | B | B | Inv. |
| 12B | 5B | black-light | 0.4 second | C | D | Comp. |
| 13B | 1B | black-light | 3 seconds | D | D | Comp. |

Inv.; Present Invention
Comp.; Comparative Example

As can clearly be seen from Table 7B, Samples 7B–11B in which exposure initiation time, after the aforesaid photocurable ink ejected from the ink-jet head was impinged on the substrate, was maintained in the range of 0.001–2 seconds and ink comprising an oxetane compound, in which at least position 2 was substituted was employed, exhibited excellent character quality, and resulted in no color mixing, compared to Samples 12B and 13B which were not prepared as above.

Example 3B

Ink Composition Sets 1B–5B were prepared in the same manner as Example 1B. Subsequently, ink-jet images were formed in the same manner as Example 1, except that illuminance (mW/cm$^2$) on the substrate surface after ink ejection (also called ink discharge) was varied as shown in Table 8B. Resulting Ink-jet Image Recorded Samples 14B–19B were evaluated in the same manner as Example 1B.

Illuminance during light exposure was determined employing UV40D/V (manufactured by Ushio Denki Co.). Table 8B shows the results.

TABLE 8B

| Ink-jet Image Recorded Sample No. | Ink Set | Exposure Apparatus | Exposure Illuminance mW/cm$^2$ | Exposure Light Amount mJ/cm$^2$ | Scratch Resistance | Adhesion Property | Remarks |
|---|---|---|---|---|---|---|---|
| 14B | 1B | black-light | 5 | 3 | 120 | A | Inv. |
| 15B | 2B | black-light | 5 | 5 | 150 | A | Inv. |
| 16B | 3B | black-light | 5 | 3 | 130 | A | Inv. |
| 17B | 4B | black-light | 5 | 3 | 130 | A | Inv. |
| 18B | 5B | black-light | 5 | 15 | 50 | B | Comp. |
| 19B | 1B | high pressure mercury | 100 | 3 | 50 | C | Comp. |

Inv.; Present Invention
Comp.; Comparative Example

As can clearly be seen from Table 8B, Samples 14B–17B in which ink-jet images were formed, while illuminance on the substrate surface during light exposure was controlled to be in the range of 0.1–50 mW/cm at 200–450 nm, while regulating the energy input amount to the light source and ink was used which comprised compounds having oxetane ring(s) in which at least position 2 was substituted, exhibited high scratch resistance of the resulting ink surface (also called the ink-jet image surface) as well as excellent adhesion property, compared to Samples 18 and 19 which were not prepared as above.

EXAMPLES: C

The present invention will now be described based on examples. However, the present invention is not limited thereto.

(Preparation of Present Invention Inks 1C–8C)

The pigment, dispersing agent, oxirane group containing compound, oxetane ring containing compound, and vinyl ether compound, shown in Table 1C, were all charged into a sand mill and dispersed for 4 hours, whereby an actinic radiation curable ink composition was prepared. Subsequently, a photoinitiator was added to the aforesaid composition, and slowly mixed until the aforesaid photoinitiator was dissolved. Thereafter, the resulting mixture was filtered under pressure employing a membrane filter, whereby an actinic radiation curable ink-jet ink was prepared. The resulting ink was loaded into an ink-jet printer, having a piezo head, and printing was performed on polyethylene terephthalate film. Subsequently, curing was carried out at a substrate conveyance rate of 500 mm/second, employing a UV exposure apparatus (8 cold cathode tubes: 20 W output).

TABLE 1C

| Present Invention Ink | 1C | 2C | 3C | 4C | 5C | 6C | 7C | 8C |
|---|---|---|---|---|---|---|---|---|
| Pigment | | | | | | | | |
| P1 | 5 | 5 | | | | | | |
| P2 | | | 5 | 5 | | | | |
| P3 | | | | | 5 | 5 | | |
| P4 | | | | | | | 5 | 5 |
| Oxirane Containing Compound | | | | | | | | |
| Celoxide 3000 | 50 | 20 | 5 | 10 | 20 | 10 | 40 | 40 |
| Celoxide 2021 P | | 10 | 10 | | 10 | 20 | | 5 |
| Oxetane Ring Containing Compound | | | | | | | | |
| Exemplified Compound 1 | | | 50 | | | | | 80 |
| Exemplified Compound 2 | 90 | 70 | | | | 90 | | |
| Exemplified Compound 3 | | | | 50 | 60 | | 70 | |
| Vinyl Ether Compound DVE-3 | 10 | 40 | 40 | 10 | | 40 | 10 | 20 |
| Pigment Dispersing Agent 32000 | 3 | 3 | 3 | 3 | 3 | 3 | 3 | 3 |
| Initiator | | | | | | | | |
| SP-152 | 10 | | | | 10 | | | |
| SP-172 | | | 10 | 10 | | | | 10 |
| UVI6990 | | 10 | 10 | | | | 10 | |

Compounds in Table 1C are described below. The numerical figure represents the number of parts.

Pigment

P1: 250 parts of crude copper phthalocyanine ("Copper Phthalocyanine", manufactured by Toyo Ink Co.), 2,500 parts of sodium chloride, and 160 parts of polyethylene glycol ("Polyethylene Glycol 300", manufactured by Tokyo Kasei Co.), were charged in a 1-gallon styrene kneader (manufactured by Inoue Seisakusho Co.) and kneaded for 3 hours. Subsequently, the resulting mixture was charged into 2.5 L of heated water, and the resulting mixture was stirred for approximately one hour while heated to approximately 80° C. to form a slurry. Thereafter, the resulting slurry was filtered, washed with water 5 times to remove sodium chloride and solvents, and spray-dried, whereby a dried processing pigment was prepared. Subsequently, a processing pigment was prepared in the same manner as P1.

P2: 250 parts of quinacridone based red pigment ("Sincasia Magenta RT-355-D), manufactured by Ciba-Geigy Ltd.), 2,500 parts of sodium chloride, and 160 parts of polyethylene glycol ("Polyethylene Glycol 300", manufactured by Tokyo Kasei Co.) were charged into a 1-gallon styrene kneader. A processing pigment was then prepared in the same manner as P1.

P3: 250 parts of benzimidazolone based pigment ("Fosterperm Yellow H3G", manufactured by Hoechst Co.), 2,500 parts of sodium chloride, and 160 parts of polyethylene glycol ("Polyerthylene Glycol 300", manufactured by Tokyo Kasei Co.) were charged into a 1-gallon styrene kneader. A processing pigment was then prepared in the same manner as P1.

P4: carbon black pigment "Printex 150T" (manufactured by Degusa Corp.)

Oxirane Group Containing Compound

Celoxide 3000: alicyclic epoxy (manufactured by Daiseru Co.)

Celoxide 2021P: alicyclic epoxy (manufactured by Daiseru Co.)

Vinyl Ether Compound

DVE-3: triethyleneglycol divinyl ether (manufactured by ISP Co.)

Pigment Dispersing Agent

32000: modified aliphatic dispersing agent ("Solsperse 32000, manufactured by Zeneca Co.)

Initiator

SP-152: triphenylsulfonium salt (Adeka Optomer SP-152, manufactured by Asahi Denka Co.)

Sp-172: triphenylsulfonium salt (Adeka Optomer SP-170, manufactured by Asahi Denka Co.)

UV16990: triphenylsulfonium salt ("Cylacure UVI-6990", manufactured by Union Carbide Co.)

(Preparation of Comparative Inks 1C–8C)

A pigment, dispersing agent, and monomer were charged into a sand mill and dispersed for 4 hours, whereby a liquid actinic radiation curable ink-jet ink composition was prepared. Subsequently, a photoinitiator was added to the aforesaid liquid ink composition and mixed slowly until the aforesaid photoinitiator was dissolved. Thereafter, the resulting mixture was filtered under pressure employing a membrane filter, whereby an actinic radiation curable ink-jet ink was prepared. The resulting ink was loaded into an ink-jet printer, having a piezo head, and printing was performed onto the aforesaid substrate. Subsequently, curing was carried out at a substrate conveyance rate of 500 mm/second, employing a UV exposure apparatus (8 cold cathode tubes: 20 W output).

TABLE 2C

| Comparative Ink | 1C | 2C | 3C | 4C | 5C | 6C | 7C | 8C |
|---|---|---|---|---|---|---|---|---|
| Pigment | | | | | | | | |
| P1 | 5 | 5 | | | | | | |
| P2 | | | 5 | 5 | | | | |
| P3 | | | | | 5 | 5 | | |
| P4 | | | | | | | 5 | 5 |
| Oxirane Containing Compound | | | | | | | | |
| Celoxide 3000 | 50 | 20 | 5 | 10 | 20 | 10 | 40 | 40 |
| Celoxide 2021 P | | 10 | 10 | | 10 | 20 | | 5 |
| Oxetane Ring Containing Compound | | | | | | | | |
| OXT-121 | | | 50 | | | | | 80 |
| OXT-211 | 90 | 70 | | | | 90 | | |
| OXT-101 | | | | 50 | 60 | | 70 | |
| Vinyl Ether Compound DVE-3 | 10 | 40 | 40 | 10 | | 40 | 10 | 20 |
| Pigment Dispersing Agent 32000 | 3 | 3 | 3 | 3 | 3 | 3 | 3 | 3 |
| Initiator | | | | | | | | |
| SP-152 | 10 | | | | | 10 | | |
| SP-172 | | | | 10 | 10 | | | 10 |
| UVI6990 | | 10 | 10 | | | | 10 | |

Employed as compounds in Table 2C, except for oxetane ring containing compounds described below, were the same compounds used in Present Invention Inks 1C–8C.

Oxetane Ring Containing Compounds
OXT-121: 1,4-bis{[(3-ethyl-3-oxetanyl)methoxy]methyl}benzene (manufactured by Toa Gosei Co.)
OXT-211: 3-ethyl-3-(phenoxymethyl)oxetane (manufactured by Toa Gosei Co.)
OXT-101: 3-ethyl-3-hydroxymethyloxetane (manufactured by Toa Gosei Co.

Present Invention Inks 1C–8C and Comparative Inks 1C–8C, as well as printed matter prepared by those inks were evaluated as described below. Table 3C shows the results.

Evaluation methods for items described in Table 3C are as follows.

Curability: the number of passes of the conveyor UV lamp until no tackiness was felt manually Stability (oxetane ring containing compounds): after the oxetane ring containing compound was stored at 100° C. for one month, the resulting dispersion state was visually evaluated and any viscosity change was also noted for evaluation.
A: No viscosity change was noticed
B: Increase in viscosity was noticed
C: Generation of gelled materials was noticed Stability (ink): After storing the ink at 25° C. for one month, its dispersion state was visually evaluated, and any viscosity change was also noted for evaluation.
A: No formation of precipitates was noticed, resulting in no viscosity change
B: No formation of precipitates was noticed, resulting in a slight decrease in the viscosity
C: Formation of precipitates was noticed Stability (ejection): After continuous ink ejection for 30 minutes, the presence and absence of no ejection nozzles was observed and continuous ejectability was evaluated based on the criteria below.
A: During 30-minute continuous ejection, all nozzles performed ejection
B: During 30-minute continuous ejection, all nozzles performed ejection, but satellites resulted
C: During 30-minute continuous ejection, some nozzles performed no ejection Layer Strength: The strength of the cured layer was evaluated employing a finger nail scratch test
A: The layer was not removed by scratching
B: The layer was removed somewhat by scratching
C: The layer was easily removed by scratching Contact Adhesion Property: The image printed surface, prepared as above, was subjected to cross-cutting of 11 longitudinal and lateral lines at an interval of 1 mm in accordance with JIS K 5400 to form 100 squares having a side length of 1 mm. Thereafter, Cellotape (registered trade mark) was adhered on the cross-cut surface. Subsequently, the Cellotape was rapidly pulled at an angle of 90 degrees and the remaining printed images, not peeled off, or the state of the cross-cut surface were evaluated based on the criteria below. The image printed surface which was not subjected to the aforesaid cross-cut was also evaluated in the same manner.
A: Employing the cross-cut test method, no printed images were peeled off
B: In the cross-cut test, printed images were slightly peeled off, while when the image surface was not cut, almost no peeling was noticed
C: Under both conditions, the image surface was easily peeled employing Cellotape (registered trade mark).

Solvent Resistance and Water Resistance: A sample prepared by printing images onto a film was immersed in alcohol at 50° C. and warm water for 10 seconds, and image damage and the degree of contraction were visually evaluated based on the criteria below.
A: No changes were noticed
B: Slight damage and contraction were noticed
C: Marked damage and contraction were noticed

TABLE 3C

| Ink Printer Matter | Curability | Stability Oxetane Ring Containing Compound | Ink | Ejection | Layer Strength | Close Contact Property | Solvent Resistance | Water Resistance |
|---|---|---|---|---|---|---|---|---|
| Present Inv. 1C | 1 | A | A | A | A | A | A | A |
| Present Inv. 2C | 1 | A | A | A | A | A | A | A |
| Present Inv. 3C | 1 | A | A | A | A | A | A | A |
| Present Inv. 4C | 1 | A | A | A | A | A | A | A |
| Present Inv. 5C | 1 | A | A | A | A | A | A | A |
| Present Inv. 6C | 1 | A | A | A | A | A | A | A |
| Present Inv. 7C | 1 | A | A | A | A | A | A | A |

TABLE 3C-continued

| Ink Printer Matter | Curability | Oxetane Ring Containing Compound | Ink Ejection | Layer Strength | Close Contact Property | Solvent Resistance | Water Resistance |
|---|---|---|---|---|---|---|---|
| Present Inv. 8C | 1 | A | A | A | A | A | A |
| Comparative Example 1C | 6 | A | A | B | C | C | C | C |
| Comparative Example 2C | 6 | A | A | B | C | C | C | C |
| Comparative Example 3C | 4 | A | A | C | B | B | B | B |
| Comparative Example 4C | 6 | A | A | B | C | C | C | C |
| Comparative Example 5C | 6 | A | A | B | C | C | C | C |
| Comparative Example 6C | 6 | A | A | B | C | C | C | C |
| Comparative Example 7C | 6 | A | A | B | C | C | C | C |
| Comparative Example 8C | 4 | A | A | C | B | B | B | B |

As can clearly seen from Table 3C, curability, ejection stability of nozzles, layer strength, contact adhesion property of printed images, and solvent resistance as well as water resistance of printed images were superior to the comparative samples.

In the present invention, it is preferable that actinic radiation is exposed 0.001–1 second after impingement of the actinic radiation curable ink. When the exposure interval of exposure radiation is at most 0.001 second, the distance between nozzles and the radiation source becomes too narrow, whereby the head may be stained with sublimed materials formed by curing or nozzles may be clogged due to stray light. On the other hand, when it is at least 1 second, the effects of the present invention are not fully exhibited.

Specifically it is preferable that radiation exposure starts 0.01–2 seconds, preferably 0.01–0.4 second after impingement of the ink on the substrate and radiation exposure is terminated after 0.1–3 seconds, preferably after 0.2–1 second so that ink fluidity almost disappears. By doing so, it is possible to minimize an increase in the dot size as well as bleeding of dots.

Further, in the present invention, one of the preferred embodiments of the exposure method of actinic radiation is that the actinic radiation has a peak illuminance of 1–500 mW/cm$^2$ as the effective curing wavelength.

Still further, in the present invention, another preferred embodiment of the exposure method of actinic radiation is that the peak illuminance of the actinic radiation in the effective wavelength region for curing is 500–2,000 mW/cm$^2$.

Printed matter employing the actinic radiation curable resinous composition (ink) of the present invention will now be described.

Printed matter of the present invention is characterized in being prepared by employing the image forming method of the present invention, and/or the image forming apparatus described in the present invention, while using non-absorptive recording materials. "Non-absorptive", as described herein, means that the actinic radiation curable resinous composition (ink) is not absorbed. In the present invention, recording materials which have an ink transfer amount of at most 0.1 ml/mm$^2$ determined by Bristow's method, described below, or substantially 0 ml/mm$^2$ are defined as non-absorptive recording materials.

Bristow's method, as described in the present invention, refers to the method which determines liquid absorption behavior of paper and paper board over a short time period. In practice, measurement is performed in accordance with J. TAPPI Paper and Pulp Test Method No. 51-87 Test Method of Liquid Absorption of Paper or Paper Board (Bristow's Method). The resulting liquid absorption is represented by ink transfer amount (ml/m$^2$) within a contact time of 40 milliseconds. Incidentally, in the aforesaid measurement method, pure water (such as ion exchanged water) is employed. However, in the present invention, in order to easily discriminate already measured areas, water-soluble dyes may be incorporated in an amount of at most 2 percent.

One example of the specific measurement methods will now be described.

The ink transfer amount is measured as follows. A recording medium is allowed to stand at an ambience of 25° C. and 50 percent relative humidity for at least 12 hours. Thereafter, measurement is carried out employing Bristow Tester Type II (a pressing system), manufactured by Kumagai Riki Kogyo Co., Ltd., which is a dynamic liquid absorbability testing device. In order to enhance measurement accuracy, a commercially available water based ink-jet ink (e.g., magenta ink) is employed as the liquid used for the measurement. After the specified contact time, it is possible to determine the ink transfer amount by measuring the magenta dyed area on the recording medium.

As supports for the present invention, various types of non-absorptive supports can be used other than common coated paper and non-coated paper. Among them, preferably used are non-absorptive plastics and film supports used for soft packaging materials.

Examples of non-absorptive supports are various types of plastic films including PET (polyethylene terephthalate) film, OPS (oriented polystyrene) film, OPP (oriented polypropylene) film, ONy (oriented nylon) film, PVC (polyvinyl chloride) film, PE film, and TAC film. Employed as other plastic films may be polycarbonate, acrylic resins, ABS, acetal, PVA, and rubber. Further, metal and glass may also be employed.

Of these recording materials, when images are formed specifically on PET film, OPS film, OPP film, ONy film, or PVC film which are thermally shrinkable, the effects of the present invention are more pronounced. These substrates tend to curl and deform due to contraction during ink curing and heat generated during the curing reaction. In addition, it is difficult for the ink layer to keep up with contraction of the aforesaid substrate.

The surface energy values of the aforementioned plastic films different from each other. It has been a problem that a dot diameter after ink-jetting varies depending on the recording materials. The preferred composition of the present invention includes OPP film and OPS film having a low surface energy and PET film having a relatively large surface energy. A wide variety of recording materials having a wettability index of 35 to 60 mN/m can be used to yield a detailed image. Preferred recording materials for the present invention are those having a wettability index of 40 to 60 mN/m.

In the present invention, form the viewpoint of the cost of recording materials such as packaging cost as well as production cost, print production efficiency, and compatibility with prints of various sizes, it is more advantageous to used long (web) recording materials.

EXAMPLES:D

The present invention will now be detailed with reference to examples. However, the present invention is not limited thereto.

<Preparation of Ink-jet Ink>

Magenta Pigment Dispersion was prepared using the formulation below.

| | |
|---|---|
| C.I. Pigment Red-184 | 15 weight parts |
| Polymer dispersing agent | 2 weight parts |
| Aron Oxetane OXT-221 (manufactured by Toa Gosei) | 83 weight parts |

Subsequently, the following blending was carried out. The resulting mixture was filtered employing a 0.8μ membrane filter and dehydrated under vacuum while heated at 50° C., whereby Magenta Inks 1D–6D were prepared.

The structures of Multifunctional oxetane compounds 1D to 7D are shown as follows.

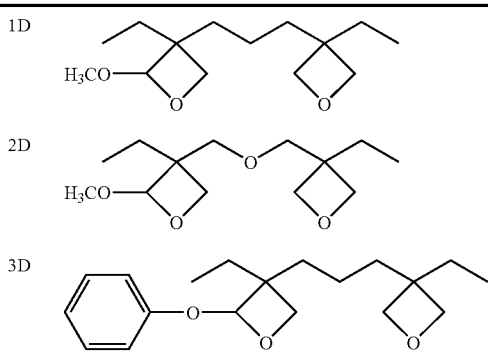

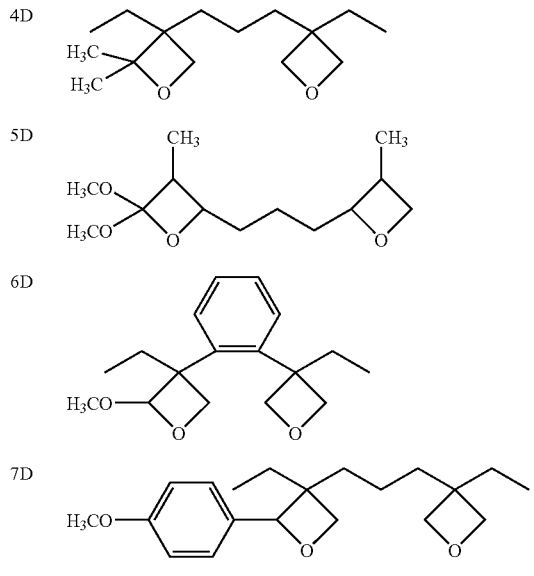

(Magenta Ink 1D)

| | |
|---|---|
| Magenta Pigment Dispersion | 17 weight parts |
| Multifunctional oxetane (Compound Example 1D) | 80 weight parts |
| Celoxide 2021P (Daiseru UCB) | 20 weight parts |
| SP-152 (photolytically acid generating agent, manufactured by Asahi Denka Co.) | 5 weight parts |

(Magenta Ink 2D)

| | |
|---|---|
| Magenta Pigment Dispersion | 17 weight parts |
| Multifunctional oxetane (Compound Example 4D) | 80 weight parts |
| Celoxide 2021P (Daiseru UCB) | 20 weight parts |
| UVI-6990 (photolytically acid generating agent, manufactured by Dow Chemicals) | 5 weight parts |

(Magenta Ink 3D)

| | |
|---|---|
| Magenta Pigment Dispersion | 17 weight parts |
| Multifunctional oxetane (Compound Example 5D) | 70 weight parts |
| Celoxide 2021P (Daiseru UCB) | 20 weight parts |
| Celoxide 3000 (Daiseru UCB) | 10 weight parts |
| SP-152 (photolytically acid generating agent, manufactured by Asahi Denka Co.) | 5 weight parts |

(Magenta Ink 4D)

| | |
|---|---|
| Magenta Pigment Dispersion | 17 weight parts |
| Multifunctional oxetane (Compound Example 7D) | 70 weight parts |
| Celoxide 2021P (Daiseru UCB) | 20 weight parts |
| Celoxide 3000 (Daiseru UCB) | 10 weight parts |
| UVT-6990 (photolytically acid generating agent, manufactured by Dow Chemicals) | 5 weight parts |

(Magenta Ink 5D)

| | |
|---|---|
| Magenta Pigment Dispersion | 17 weight parts |
| Multifunctional oxetane (Compound Example 2D) | 40 weight parts |
| Aron Oxetane OXT-221 (manufactured by Toa Gosei) | 30 weight parts |
| Celoxide 2021P (Daiseru UCB) | 20 weight parts |
| SP-152 (photolytically acid generating agent, manufactured by Asahi Denka Co.) | 5 weight parts |

-continued

| (Magenta Ink 6D) Comparative Example | |
|---|---|
| Magenta Pigment Dispersion | 17 weight parts |
| Aron Oxetane OXT-221 (manufactured by Toa Gosei) | 40 weight parts |
| Aron Oxetane OXT-211 (manufactured by Toa Gosei) | 30 weight parts |
| Celoxide 2021P (Daiseru UCB) | 30 weight parts |
| SP-152 (photolytically acid generating agent, manufactured by Asahi Denka Co.) | 5 weight parts |

Each of the inks prepared as above was ejected onto sheets of a corona treated PET (polyethylene terephthalate) film as a substrate, employing piezo type ink-jet nozzles (nozzle pitch of 360 dpi wherein dpi represents the number of dots per inch or per 2.54 mm) capable of forming a liquid droplet volume of 7 pl, while maintaining the nozzle section at 50° C. Employed as a light source was a fluorescent tube having a main peak at 308 nm. Exposure was initiated 0.2 second after ink impingement under conditions of the illuminance on the substrate surface of 10 mW/cm$^2$ just under the light source, and after 0.7 second, exposure was terminated (at an exposure energy of 5 mJ/cm$^2$). The aforesaid test was carried out at a low humidity ambience (25° C. and 20 percent). Further, in order to evaluate ambience adaptability, Inks 1D, 5D, and 6D were evaluated in the same manner as above at a high humidity ambience (25° C. and 80 percent).

Ink curability, close adhesion property to substrates, and image bleeding were evaluated.

<Ink Curability>
A: No tackiness was noticed even though touched immediately after exposure
B: Slight tackiness was noticed when touched after exposure, but after one minute, tackiness was not noticed
C: Tackiness was noticed even one minute after exposure <Close Adhesion Property to Substrates>
A: The image was not peeled off using a tape peeling procedure
B: The image was partially peeled off using a tape peeling procedure
C: The image was entirely peeled off using a tape peeling procedure <Image Bleeding>
A: Almost no bleeding between adjacent dots was noticed
B: Slight bleeding between adjacent dots was noticed
C: Marked bleeding of dots was noticed

TABLE 1D

| Ink | Ambience (humidity) | Ink Curability | Close Adhesion Property to Substrates | Image Bleeding |
|---|---|---|---|---|
| 1D | 20% | A | A | A |
| 1D | 80% | A | A | A |
| 2D | 20% | A | A | A |
| 3D | 20% | A | A | A |
| 4D | 20% | A | A | A |
| 5D | 20% | A | A | A |
| 5D | 80% | A | A | A |
| 6D | 20% | B | B | B |
| 6D | 80% | C | C | C |

The same evaluation was carried out, except that the exposure was initiated 0.6 second after ink impingement and after 1.1 seconds, exposure was terminated.

TABLE 2D

| Ink | Ambience (humidity) | Ink Curability | Close Adhesion Property to Substrates | Image Bleeding |
|---|---|---|---|---|
| 1D | 20% | A | A | A |
| 1D | 80% | A | A | B |
| 2D | 20% | A | A | A |
| 3D | 20% | A | A | A |
| 4D | 20% | A | A | A |
| 5D | 20% | A | A | A |
| 5D | 80% | A | A | A |
| 6D | 20% | B | B | C |
| 6D | 80% | C | C | C |

As can clearly be seen in Tables 1D and 2D, ink-jet inks according to the preset invention exhibited excellent curability, as well as excellent close adhesion property to substrates, and minimal image bleeding, irrespective of low or high humidity ambiences. Further, it can be seen that even though the exposure initiating time was slightly delayed, the aforesaid inks tended to show minimal image bleeding.

EXAMPLES: E

The present invention will now be described with reference to examples. However, the present invention is not limited thereto.

Example (Preparation of Coating Compositions)
Each of the actinic radiation curable compositions (inks) was prepared in such a manner that each of Present Invention Compounds 1E, 2E, 3E, and 8E, and Comparative Compound, being a cationically polymerizable compound, shown in Table 1E, and a compound (SP-152, manufactured by Asahi Denka Co., Ltd.) were dissolved while stirring and the resulting solutions were mixed.

TABLE 1E

| | Example 1E | Example 2E | Example 3E | Example 4E | Comparative Example |
|---|---|---|---|---|---|
| Compound Example 1E 2-trifluoromethylcarbonyl-3,3-dimethyloxetane | 95% | — | — | — | — |
| Compound Example 2E 2-metoxy-3,3-dimethyloxetane | — | 95% | — | — | — |

TABLE 1E-continued

|  | Example 1E | Example 2E | Example 3E | Example 4E | Comparative Example |
|---|---|---|---|---|---|
| Compound Example 3E 3,3'-trimethylenebis(3-ethyloxetane) | — | — | 95% | — | — |
| Compound Example 8E 2,2'-trimethylenebis(3,4,4-trimethyloxetane) | — | — | — | 95% | — |
| Comparative Compound 1'-bis[3-ethyloxetane-3-il]methyl ether | — | — | — | — | 95% |
| SP-152 (manufactured by Asahi Denka Co., Ltd.) | 5% | 5% | 5% | 5% | 5% |

The aforesaid compositions were well stirred and dissolved. Thereafter, the resulting ink was applied onto a 38 μm thick PET (polyethylene terephthalate) support, employing a #8 wire bar, whereby a coated layer was prepared. The resulting coated layer was evaluated employing the method described below.

<Evaluation>

The resulting coated layer was exposed employing a 4 kW high pressure mercury lamp unit having a substrate conveyer. Subsequently curing rate was determined.

Illuminance onto the exposed surface was set at 1,000 mW/cm$^2$, and energy of the exposed radiation was controlled by varying the speed of the aforesaid conveyer. The radiation was exposed to the entire ink coated surface while the integral radiation amount was variable from 50 to 600 MJ/cm$^2$. Curing speed was determined when no surface tackiness was noticed. The aforesaid curing speed was evaluated at 25° C. and 30 percent relative humidity.

Further, each of the prepared inks was stored at 55° C. and the resulting viscosity was determined at 25° C. (employing a Type E Viscosimeter, manufactured by Tokyo Keiki Co.).

TABLE 2E

|  |  | Electron Density of Oxetane Oxygen | Electron Density of Oxygen out of Oxetane | 35% RH Speed mJ/cm$^2$ | Viscosity before Storage | Viscosity after 7-Day Storage at 55° C. |
|---|---|---|---|---|---|---|
| Example 1E | 2-trifluoromethylcarbonyl-3,3-dimethyloxetane | −0.245 | −0.182 | 80 | 30 m · Pa | 30 m · Pa |
| Example 2E | 2-methoxy-3,3-dimethyloxetane | −0.301 | −0.28 | 90 | 35 m · Pa | 35 m · Pa |
| Example 3E | 3,3'-trimethylenebis(3-ethyloxetane) | −0.281 | — | 80 | 35 m · Pa | 35 m · Pa |
| Example 4E | 2,2'-trimethylenebis(3,4,4-trimethyloxetane) | −0.277 | — | 50 | 35 m · Pa | 35 m · Pa |
| Comparative Example | 1,1'-bis[3-ethyloxetane-3-il]methyl ether | −0.27 | −0.27 | 110 | 20 m · Pa | Gel formation |

As can clearly be seen from Table 2E, actinic radiation curable compositions (inks) according to the present invention exhibited high speed as well as excellent storage stability to the degree that inks according to the present invention resulted in a minimal increase in viscosity, while the ink of Comparative Example, in which the conventional oxetane compound was used, gelled.

According to the present invention, it is possible to provide oxetane compounds capable of resulting in high quality images without bleeding, which exhibit excellent ink curability as well as excellent substrate adhesion property, while not being adversely affected by ambient humidity even while employing a low illuminance light source, an ink-jet ink capable of forming high quality images, and the image forming method using the aforesaid ink-jet ink.

What is claimed is:

1. A method for forming an image, comprising the steps of:
    jetting a droplet of a photocurable ink comprising an oxetane compound having a substituent at the 2-position of the molecule from an ink-jet head onto a recording material; and
    irradiating the jetted droplet of the ink with a an active ray,
    wherein an amount of an energy input to an exposure light source for supplying the active ray is 0.1 to 50 W/cm.

2. A method for forming an image, comprising the steps of:
    jetting a droplet of a photocurable ink comprising an oxetane compound having a substituent at the 2-position of the molecule from an ink-jet head onto a recording material; and
    irradiating the jetted droplet of the ink with an active ray,
    wherein the irradiating step is carried out between 0.001 and 2.0 seconds after the jetted droplet of the ink reaches on the recording material.

3. A method for forming an image of claim 1,
    wherein an illuminance on a surface of the recording material during the irradiating step is from 0.1 to 50 mW/cm$^2$ in a range of 200 to 450 nm.

4. A method for forming an image of claim 1,
    wherein the active ray is an ultraviolet ray having a peak wavelength of 200 to 420 nm.

5. The method for forming an image of claim 1,
    wherein the oxetane compound has an electron-donating group and an electron-withdrawing group in the molecule.

6. The method for forming an image of claim 1,
wherein the oxetane compound is represented by General Formula (1):

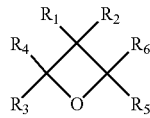

General Formula (1)

wherein each $R_1$ to $R_6$ is independently a hydrogen atom or a substituent, provided that at least one of $R_3$ and $R_4$ is a substituent, and at least one of $R_5$ and $R_6$ is a substituent.

7. The method for forming an image of claim 6,
wherein the oxetane compound has an electron-donating group at the 2-position of the molecule, and an electron-withdrawing group at the 4-position of the molecule.

8. The method for forming an image of claim 5,
wherein the oxetane compound has a substituent at the 3-position of the molecule.

9. The method for forming an image of claim 1,
wherein the oxetane compound has at least two oxetane rings in the molecule, and at least one of the rings is represented by General Formula (I):

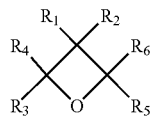

General Formula (1)

wherein each $R_1$ to $R_6$ is independently a hydrogen atom or a substituent, provided that at least one of $R_3$ and $R_4$ is a substituent, and at least one of $R_5$ and $R_6$ is a substituent.

10. The method for forming an image of claim 9,
wherein at least one of oxygen atoms of the oxetane rings has a largest electron density in the oxetane compound.

11. The method for forming an image of claim 1,
wherein the oxetane compound further comprises an oxygen atom other than an oxygen atom of an oxetane ring, and an electron density of the oxygen atom other than the oxygen atom of the oxetane ring is less than an electron density of the oxygen atom of the oxetane ring.

12. The method for forming an image of claim 1,
wherein the ink further comprises a photo-acid generating compound.

13. The method for forming an image of claim 1,
wherein the ink further comprises a compound selected from the group consisting of:
(i) mono-oxetane ring containing compounds;
(ii) epoxy compounds; and
(iii) vinyl ether compounds.

14. The method for forming an image of claim 2,
wherein the oxetane compound has an electron-donating group and an electron-withdrawing group in the molecule.

15. The method for forming an image of claim 2,
wherein the oxetane compound is represented by General Formula (1):

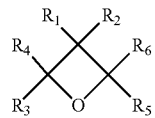

General Formula (1)

wherein each $R_1$ to $R_6$ is independently a hydrogen atom or a substituent, provided that at least one of $R_3$ and $R_4$ a substituent, and at least one of $R_5$ and $R_6$ is a substituent.

16. The method for forming an image of claim 15,
wherein the oxetane compound has an electron-donating group at the 2-position of the molecule, and an electron-withdrawing group at the 4-position of the molecule.

17. The method for forming an image of claim 14,
wherein the oxetane compound has a substituent at the 3-position of the molecule.

18. The method for forming an image of claim 2,
wherein the oxetane compound has at least two oxetane rings in the molecule, and at least one of the rings is represented by General Formula (1):

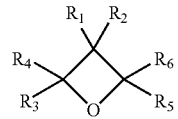

General Formula (I)

wherein each $R_1$ to $R_6$ is independently a hydrogen atom or a substituent, provided that at least one of $R_3$ and $R_4$ is a substituent, and at least one of $R_5$ and $R_6$ is a substituent.

19. The method for forming an image of claim 18,
wherein at least one of oxygen atoms of the oxetane rings has a largest electron density in the oxetane compound.

20. The method for forming an image of claim 2,
wherein the oxetane compound further comprises an oxygen atom other than an oxygen atom of an oxetane ring, and an electron density of the oxygen atom other than the oxygen atom of the oxetane ring is less than an electron density of the oxygen atom of the oxetane ring.

21. The method for forming an image of claim 2,
wherein the ink further comprises a photo-acid generating compound.

22. The method for forming an image of claim 2,
wherein the ink further comprises a compound selected the group consisting of:
(i) mono-oxetane ring containing compounds;
(ii) epoxy compounds; and
(iii) vinyl ether compounds.

* * * * *